(12) United States Patent
Tsukagoshi

(10) Patent No.: US 7,643,229 B2
(45) Date of Patent: Jan. 5, 2010

(54) OPTICAL SYSTEM

(75) Inventor: Takuya Tsukagoshi, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/803,431

(22) Filed: May 14, 2007

(65) Prior Publication Data

US 2007/0268600 A1    Nov. 22, 2007

(30) Foreign Application Priority Data

May 16, 2006    (JP)    ............... 2006-136767

(51) Int. Cl.
*G02B 7/02*    (2006.01)
*G02B 5/10*    (2006.01)
(52) U.S. Cl. ..................... 359/811; 359/858
(58) Field of Classification Search .............. 359/9–15, 359/238, 811, 351, 570, 572, 858, 859
See application file for complete search history.

(56) References Cited

U.S. PATENT DOCUMENTS 5,989,923 A * 11/1999 Lowe et al. ............... 436/518
7,145,710 B2 * 12/2006 Holmes ..................... 359/279
7,286,272 B2 * 10/2007 Mukawa .................... 359/13

OTHER PUBLICATIONS

J. B. Pendry; Physical Review Letters 85, 3966-3969 (2000).
M. Notomi, Physical Review B 62, 10696-10705 (2000).
D. R. Smith et al., Physical Review Letters 84, 4184-4187 (2000).
E. Hecht, "Optics", 4th ed. 471-474 (Addison-Wesley, Reading, MA, 2002).
J. Tsujiuchi et al., Handbook of Advanced Optical Technologies (Asakura Shoten, 2002) with English translation of Figure 1.5.2 (p. 194).

* cited by examiner

*Primary Examiner*—Mohammmed Hasan
(74) *Attorney, Agent, or Firm*—Kenyon & Kenyon LLP

(57) ABSTRACT

An optical system includes a negative refraction lens and a compensating element. The negative refraction lens is a flat plate formed by a material exhibiting negative refraction, and a surface on which light is incident and a surface from which the light is emerged are formed to be flat and parallel. The compensating element is an optical element which makes light incident at a predetermined angle, emerge at another predetermined angle. A light ray is emitted from an object point on an object plane, and reaches an image point on an image plane after being refracted twice by a negative refraction lens. The light ray is reflected by the compensating element, then refracted at an emergence-side pupil, and reaches the image point upon being reflected once again by the compensating element.

12 Claims, 37 Drawing Sheets

OPTICAL SYSTEM

CROSS-REFERENCE TO RELATED APPLICATION

The present application is based upon and claims the benefit of priority from the prior Japanese Patent Application No. 2006-136767 filed on May 16, 2006; the entire contents of which are incorporated herein by reference.

BACKGROUND OF THE INVENTION

1. Field of the Invention

The present invention relates to an image forming optical system such as a microscope, a camera, and an endoscope, a focusing optical system such as an optical pickup and a semiconductor exposing apparatus, and a guided-wave optical system such as an optical integrated circuit, and an optical fiber.

2. Description of the Related Art

In recent years, a resolution power of an image detecting apparatus in which an image pickup optical system such as a microscope, a camera, and an endoscope is used has been improved. Particularly, in a field of microscopes and optical recording, an almost no aberration optical system has been realized, and a resolution power as an image pickup optical system has been constrained mainly by a diffraction limit of a visible light.

On the other hand, as it has been disclosed in the Non-Patent Literature 'Physical Review Letters', Volume 85, Page 3966 (2000), by J. B. Pendry, an optical material in which a refractive index takes a negative value (hereinafter, called appropriately as a 'negative refraction material') has been realized. It has been proposed that when the negative refraction material is used, it is possible to form an image having an ultra high resolution beyond the diffraction limit (hereinafter, called appropriately as 'perfect imaging').

As it has been disclosed in Non-Patent Literature 'Physical Review Letters', Volume 85, Page 3966 (2000), by J. B. Pendry, even in a case other than a case in which the refractive index takes a negative value, when a real part of a permittivity or a permeability is a negative value, for electromagnetic waves of a specific polarization state, a negative refraction phenomenon is observed.

Moreover, as it has been disclosed in Non-Patent Literature 'Physical Review B', Volume 62, Page 10696 (2000), by M. Notomi, in a periodic structure such as a photonic crystal, as a result of a photonic band being folded in a reciprocal lattice space, irrespective of being a material having each of the refractive index, the permittivity, and the permeability a positive value, the negative refraction phenomenon has been observed for electromagnetic waves of a specific wavelength and a specific polarization state.

In view of the abovementioned circumstances, in this patent specification, a material which exhibits a negative refraction response for specific electromagnetic waves is called as a 'material exhibiting negative refraction'. It is needless to mention that a term 'material exhibiting negative refraction' is a concept having a wider sense than the negative refraction material.

Apart from the photonic crystals mentioned above, materials such as a metallic thin film, a chiral substance, photonic crystals, a metamaterial, a left-handed material, backward wave material, and a negative phase velocity medium have been known as the materials exhibiting negative refraction.

For a material having a negative value for both the permittivity and the permeability, the refractive index is also a negative value. Furthermore, such materials satisfy Snell's law, when an angle of refraction is extended up to a negative value.

In an image formation (focusing) by a normal lens, a refractive index of a lens has to differ from a refractive index of an outside of the lens, and a lens surface has to be curved, are two requirements.

Whereas, a flat plate which is made of a material exhibiting negative refraction (hereinafter, called appropriately as a "negative refraction lens") can focus the light irrespective of a radius of curvature of the surface being infinite, in other words, in spite of being a flat surface. FIG. 32 shows an image formation relationship by a negative refraction lens 31. Light from an object point 33 on an object plane 32 is focused at an image point 35 on an image plane 34, by the negative refraction lens 31.

In an image forming optical system such as a microscope, an upper-limit value of a theoretical resolution is determined by a diffraction limit. As it has been described in a textbook of optics such as Non-Patent Literature 'Optics', 4th edition (Addison-Wesley, Reading, Mass., 2002) by E. Hecht, according to a Rayleigh criterion, a minimum distance between two resolvable points is $\lambda/NA$. Here, $\lambda$ is a usable wavelength, and NA is a numerical aperture. Moreover, for a structure smaller than the diffraction limit, it can not be resolved by an optical system.

Moreover, a microscope and an optical pickup which improve the resolution by using an objective lens of a liquid immersion, an oil immersion, or a solid immersion (by using an objective lens such as a liquid-immersion objective lens, an oil-immersion objective lens, and a solid-immersion objective lens), has been proposed. An effective NA is increased in these lenses. Accordingly, a value of $\lambda/NA$ equivalent to the diffraction limit is made small. Here, the numerical aperture NA cannot be increased more than a refractive index of a medium on which the object plane is disposed. Therefore, an upper limit for the numerical aperture is about 1.5 to 2.0.

In this patent specification, when an electromagnetic wave including the light is expressed in an amplitude and phase as a wave, light for which all components of a wave-number vector included in a phase are real numbers is to be called as propagating light, and light for which at least one component is not a real number is to be called as an evanescent wave. Light which has emitted from one point in space includes two light waves namely propagating light which reaches up to a far distance, and evanescent waves which are attenuated at a distance of about a wavelength.

In Non-Patent Literature 'Physical Review Letters', Volume 85, Page 3966 (2000), by J. B. Pendry, which was disclosed in recent years, a negative materials performs a reverse amplification of the evanescent waves which are supposed to be attenuated in a direction in which a component of the wave-number vector is not originally a real number, is disclosed. Therefore, in the image formation by the negative refraction lens 31 shown in FIG. 32, the amplitude of the evanescent waves on the image plane 34 is shown to be restored to the same quantity as on the object plane 32.

In other words, in an optical system shown in FIG. 32, both the propagating light and the evanescent waves are transferred from the object plane 32 to the image plane 34. Therefore, information of the object point 33 is reproduced perfectly at the image point 35. This means that when an image forming optical system in which the negative refraction lens 31 is used, is used, the perfect imaging in which the diffraction limit is not restricted, is possible.

The perfect imaging mentioned above is not true only in theoretical terms. The negative refraction lens was made, and results of experiments have been reported. For example, in Non-Patent Literature 'Physical Review Letters', Volume 84, Page 4184 (2000), by D. R. Smith et al., a metamaterial in which, a rod and a coil made of a metal, smaller than the wavelength are arranged periodically, has been made. Functioning of such metamaterial as a negative refraction lens in a microwave region has been reported.

Moreover, in Non-Patent Literature 'Physical Review B', Volume 62, Page 10696 (2000), by M. Notomi, a method of making a negative refraction material by using a photonic crystal has been disclosed. For example, in a photonic crystal in which, air rods are arranged in a hexagonal lattice form in a dielectric substance, an effective refractive index in a photonic band becomes isotropic and negative. With respect to a frequency band which is suitable for such photonic band, the photonic crystal can be considered as a negative refraction material.

Moreover, it has been known that for many metals, a real part of the permittivity for visible light becomes positive. For example, according Non-Patent Literature 'Handbook of Advanced Optical Technology' by J. Tsujiuchi et al., (published by Asakura Shoten, Japan 2000), silver exhibits a negative permittivity for light of a wavelength in a range of 330 nm to 900 nm. Furthermore, it has been known that a gyrotropic material or a chiral substance having a spiral (helical) structure, exhibits negative refraction under predetermined conditions. In this manner, when a negative refraction lens formed by a negative refraction material is used, it is possible to realize an image forming optical system of ultra high resolution (perfect imaging) which is not constrained by the diffraction limit.

An image formation by a normal lens is shown in FIG. 30. Even when it is a lens of no matter how large the aperture is, it is not possible to make the numerical aperture NA to be greater (higher) than a refractive index of a medium which fill a space on an object side or an image side. In FIG. 30, a lens is kept in air of a refractive index $n_A$, and by using an angle $\theta_1$ between a light ray which passes through an edge portion of the aperture and an optical axis of the lens, the numerical aperture expressed by $NA=n_A \sin \theta_1$ can never go beyond $n_A$ (almost same as 1).

FIG. 31 is a diagram in which an image formation performance by the lens in FIG. 30 is expressed in terms of a modulation transfer function (MTF). A wave-number vector of a light wave bearing a transfer of an image is let to be k, and a component $k_v$ perpendicular to that optical axis is taken on a horizontal axis. Since a light wave component is greater than a wave number expressed by $k_0=2\pi/\lambda$ ($\lambda$ is a wavelength of the light wave) becomes an evanescent wave, $k_v$ doesn't reach the image plane.

Since a light wave component in which $k_v$ is smaller than $k_0$ but greater than $k_0 \sin \theta_1$ is vignetted by a pupil (aperture stop) of the lens, can not reach the image plane, as expected. Eventually, since only a light wave component which satisfies a relationship $k_v \leq k_0 \sin \theta_1$ can contribute to the image formation, a point image is spread to about wavelength. Moreover, in an actual lens, greater the $k_v$, the MTF is declined due to reflection and scattering at a lens surface.

FIG. 32 is a diagram for describing the image formation by the negative refraction lens 31. As it is shown by dotted lines in the diagram, light emitted from the object point 33 on the object plane 32 forms an image on the image point 35 on the image plane 34, after being refracted at two surfaces of the negative refraction lens 31.

As it has been disclosed in Non-Patent Document 'Physical Review Letters', Volume 85, Page 3966 (2000) by J. B. Pendry, the negative refraction lens 31 can form an image by since not only the propagating light but also the evanescent light, MTF becomes 1 for all the values of $k_v$ as shown in FIG. 33. This means that the point image becomes a point. Such a lens is called as a perfect lens, and a phenomenon is called as a perfect imaging.

Even when it is a perfect imaging which is imperfect due to various restrictions (such as a shape error, a refractive index error, and an absorption) in making practically of the negative refraction lens, when it shows superior image forming performance than a conventional lens restricted by the diffraction limit, it is called as a perfect imaging effect.

However, in a case of making the negative refraction lens in reality, a size of the lens in a direction perpendicular to the optical axis has to be finite. Therefore, propagating light which is vignetted by a pupil of the negative refraction lens such as a light ray 36 and a light ray 37 in FIG. 32, is lost from the optical system without contributing to the image formation. When a minimum angle of emergence of a light ray vignetted by a pupil on an object side surface and an image side surface of the negative refraction lens is let to be $\theta_2$ and $\theta_3$ respectively, then $\theta_2 > \theta_3$ in a situation in FIG. 32.

In other words, when an angle of emergence $\theta$ of a light ray from the object point increases gradually and exceeds $\theta_3$, the light ray is incident on the negative refraction lens, but either exits from a lens side surface as the light ray 37, or is absorbed. When the angle of emergence $\theta$ increases gradually and exceeds $\theta_2$, the light ray is not incident on the negative refraction lens, as the light ray 36.

A diagram in which the image formation performance is expressed in terms of the MTF upon taking into consideration the vignetting by the pupil of the negative refraction lens 31 in such manner is FIG. 34. Information of a frequency side higher than $k_0$ is transferred by the imaging effect of the evanescent wave, but a component of the propagating light from a lower value out of $k_0 \sin \theta_2$ and $k_0 \sin \theta_3$, up to $k_0$ is lost.

The negative refraction lens has a rare capability of amplifying the evanescent wave, which is impossible in any conventional technology. However, even when it is possible to form an image of an evanescent wave bearing fine information, taking into consideration a restriction in reality that the size of the lens is finite, the perfect imaging effect is lost due to the vignetting by the pupil.

SUMMARY OF THE INVENTION

This patent application provides an optical system which is capable of realizing a perfect imaging effect beyond a diffraction limit, by allowing a part of a component of propagating light which was lost when a size of a conventional negative refraction lens was finite, to contribute to an image formation by transferring to an image plane.

The present invention is capable of providing an optical system which includes an optical element formed of a material exhibiting negative refraction, and a guide element for guiding light to an effective aperture of the optical element.

DETAILED DESCRIPTION OF THE INVENTION

The present invention is applied to an image forming optical system which carries out an optical image formation, or a focusing optical system which focuses light, by using a negative refraction lens of a practical size. A point that even by using the negative refraction lens of the practical size, in other words, a finite size, most of components of propagating light reach an image plane, differs essentially from a conventional optical system.

Embodiments of an optical system according to the present invention will be described below while referring to the accompanying diagrams. However, this invention is not restricted by the embodiments described below.

FIRST EMBODIMENT

Figure 1:
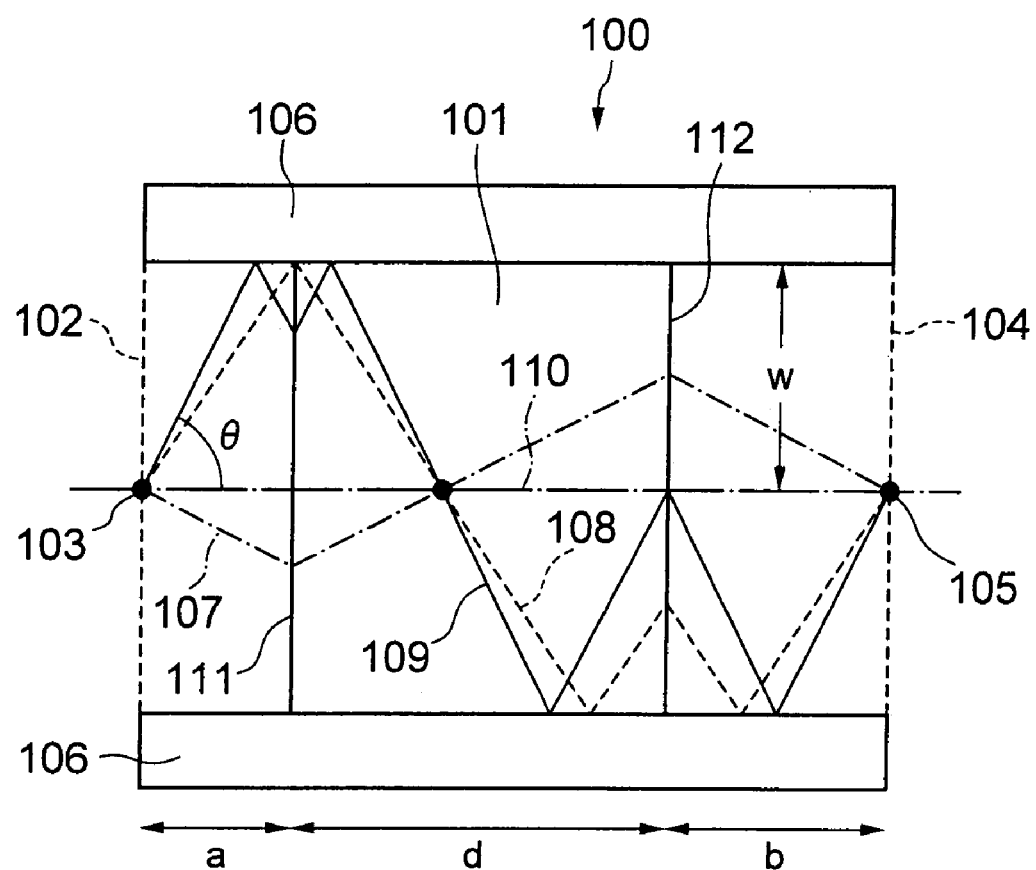
FIG. 1 is a diagram describing an image formation by an optical system according to a first embodiment of the present invention.

An optical system according to a first embodiment in which the present invention is applied is shown in FIG. 1. An optical system 100 includes a negative refraction lens 101 and a compensating element 106. A shape of the optical system 100 may be such that the optical system is a two-dimensional optical system as shown in FIG. 1, or may be an axisymmetric shape with respect to an optical axis 110, or may be a three-dimensional shape with FIG. 1 as a two-dimensional cross-section thereof. The compensating element 106 corresponds to a guide element.

The compensating element 106 is an optical element which causes light which is incident at a predetermined angle, to emerge at a different predetermined angle, and a mirror of a metal and a dielectric thin film, a diffraction grating, a hologram, and a photonic crystal etc. can be used as the compensating element 106. Higher an intensity ratio of emerging light with respect to incident light (reflectance in a case of a mirror), greater is an effect which is anticipated from the present invention.

The compensating element 106 has a function of guiding the light to an effective aperture of the negative refraction lens 101. 'Guiding light to an effective aperture' includes the following three cases.

(a) a case in which, light is allowed to be incident on a incidence-side surface of the negative refraction lens 101, (b) a case in which, light is allowed to be incident on an emergence-side surface of the negative refraction lens, and (c) a case which includes both the cases (a) and (b).

By the compensating element 106, in a most effective case, a component from a spatial frequency which is determined by a numerical aperture with respect to the effective aperture of a smaller size, out of an effective aperture of the incidence-side surface of the negative refraction lens 101 and an effective aperture of the emergence-side surface of the negative refraction lens 101, up to a spatial frequency of diffraction limit can be transferred to the image plane. Details thereof will be described later.

In FIG. 1, an optical path when a mirror is used as the compensating element 106 is shown. When the negative refraction lens has a two-dimensional rectangular shape the compensating element 106 also has a two-dimensional rectangular shape (at least a reflecting surface is flat), and when the negative refraction lens 101 has a three-dimensional circular cylindrical shape, the compensating element 106 also has a circular cylindrical shape (an inner-side side surface of the circular cylinder is a reflecting surface).

A light ray 107 is emitted from an object point 103 on an object plane 102, and reaches an image point 105 on an image plane 104 after being refracted twice by the negative refraction lens 101. A refraction phenomenon by the negative refraction lens 101, when an angle of refraction is extended up to a negative value, is in accordance with Snell's law which is well known.

A thickness of the negative refraction lens 101 is let to be d, a width in a direction perpendicular to an optical axis is let to be 2w, and the object plane 102 and the image plane 104 are let to be disposed at a distance a and b respectively from the negative refraction lens 101.

Conditions for a perfect imaging are that a refractive index $n_A$ of a medium which fills an outside of the negative refraction lens 101, and a refractive index $n_N$ of the negative refraction lens 101 are related by a relationship $n_N = -n_A$, and that a relationship $d = a+b$ is satisfied. In this case, there is no reflection at a surface of the negative refraction lens 101, and light which has emitted from the object point 103 is transferred more efficiently to the image point 105. However, even when the abovementioned conditions of the perfect imaging are not satisfied fully, corresponding to a deviation from the conditions, a perfect imaging effect in which a fine image formation than a wavelength of light is possible, is achieved.

The negative refraction plate 101 is a flat plate formed of a material exhibiting negative refraction, and a surface on which the light is incident and a surface from which the light is emerged have to be flat and parallel surfaces. Apart from this, there is no restriction in particular, regarding the shape.

The material exhibiting negative refraction is a material in which at least one of a permittivity, a permeability, and a refractive index has a negative real part. When the material exhibiting negative refraction is a structural material such as a metamaterial, it is to be a material in which at least one of an effective permittivity, an effective permeability, and an effective refractive index which are matched with a response to electromagnetic waves caused due to both of the material and the structure, has a negative real part.

Hereinafter, the permittivity, the permeability, and the refractive index will be collectively called as 'optical parameters'. Moreover, similarly, the effective permittivity, the effective permeability, and the effective refractive index will be collectively called as 'effective optical parameters'. Unless mentioned specifically, the effective optical parameters are let to be included in the optical parameters.

Here, the 'material exhibiting negative refraction' will be described further. A resolution power of a conventional optical system is restricted mainly by a diffraction limit of light. Here, an optical material of which, the refractive index takes a negative value (hereinafter, called appropriately as 'negative refraction material') is realized. As it has been mentioned above, when the negative refraction material is used, an image formation of an ultra high resolution beyond the diffraction limit is possible (hereinafter, called appropriately as 'perfect imaging').

Even in a case other than a case in which the refractive index takes a negative value, when a real part of the permittivity or the permeability is a negative value, a phenomenon of negative refraction with respect to the electromagnetic waves in a specific polarization state is observed.

In view of the abovementioned circumstances, in this patent specification, a material which exhibits a response of negative refraction with respect to specific electromagnetic waves is to be called as the 'material exhibiting negative refraction'. It is needless to mention that a term 'material exhibiting negative refraction' is a concept having a wider sense than the negative refraction material.

Concrete examples of the material exhibiting negative refraction are materials such as a metallic thin film, a chiral substance, a photonic crystal, a metamaterial, a left-handed material, a backward wave material, and a negative phase velocity medium.

A negative refraction lens 101 in the first embodiment is formed of a material exhibiting negative refraction. The negative refraction lens 101 is formed of a homogeneous material for which a relative index is approximately −1 or a structural material for which an effective relative index is approximately −1.

Here, the relative index is defined by a ratio of a refractive index of a lens material with respect to a refractive index of air. Moreover, an effective relative index in a case of the structural material is defined by an effective refractive index of the structural material with respect to the refractive index of air.

A straight line which connects an object point and an image point at which an image is formed thereof is to be called as an optical axis. As it is clear from FIG. 1, the optical axis 110 is perpendicular to a surface of the negative refraction lens 101, on the side of incidence and on the side of emergence. Unlike the conventional lens, since the optical axis varies according to the object point, when there is a possibility of mix up, the optical axis is to be called not as 'optical axis' but as an 'optical axis corresponding to the object point 103'.

Moreover, the surfaces of the negative refraction lens 101, on the side of incidence and the side of emergence respectively are called as an incidence-side pupil and an emergence-side pupil respectively. Moreover, a set thereof is called as a pupil only. In an optical path diagram in FIG. 1, the incidence-side pupil is denoted by a reference numeral 111 and the emergence-side pupil is denoted by a reference numeral 112.

According to a conventional geometric optical concept, both the incidence pupil and the emergence pupil of the negative refraction lens 101 are in an infinite direction. In this patent specification, it is necessary to note a point that, the incidence-side pupil 111 and the emergence-side pupil 112 are defined upon considering the incidence pupil and the emergence pupil as different concepts.

An angle made by a geometrical optical path of light emerged from the object point 103 with the optical axis 110 is called as an angle of emergence, and is to be denoted by θ. When θ is comparatively small as the light ray 107, after being refracted at the incidence-side pupil 111 and the emergence-side pupil 112 of the negative refraction lens 101, the light ray 107 reaches the image point 105, and can contribute to the image formation. Moreover, an angle made by the geometrical optical path of the light reaching the image point 105 with the optical axis is to be called as an image-formation angle.

Figure 32:
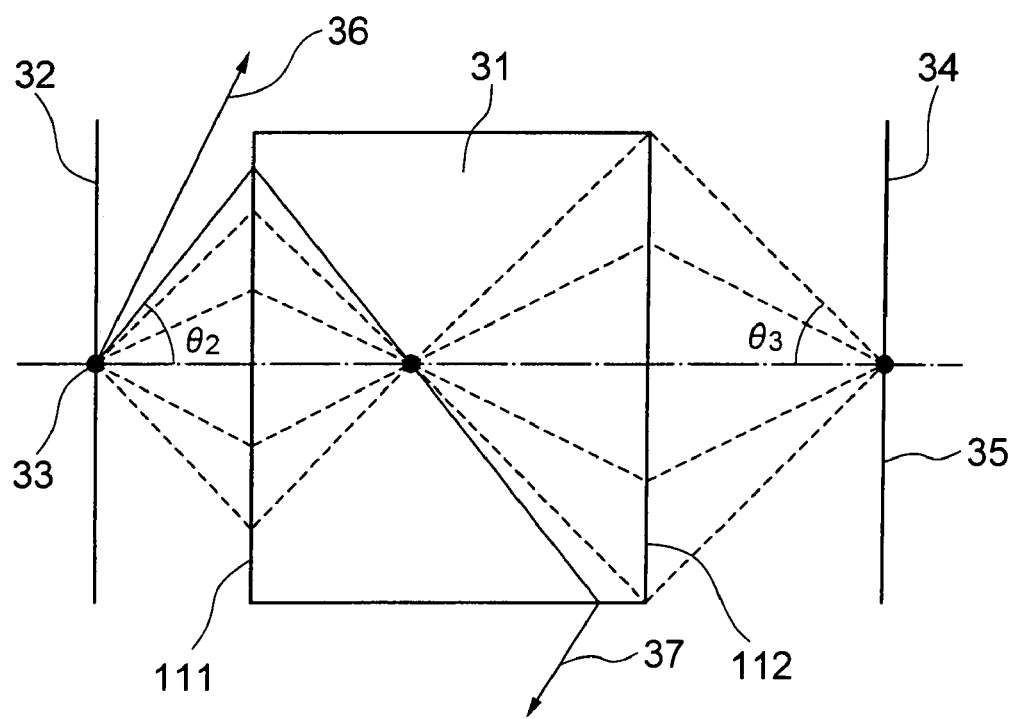
FIG. 32 is a diagram describing the image formation by the negative refraction lens.

On the other hand, when θ becomes larger (θ is increased), and $\tan\theta > \tan\theta_3 = w/b$, with the conventional negative refraction lens, it does not contribute to the image formation. This is because, as shown in FIG. 32, a light ray 37 which is refracted at the incidence-side pupil 111 is refracted at a side surface of a negative refraction lens 31 before reaching the emergence-side pupil 112, and is emerged to an outside of the lens. This situation is called as a 'vignetting by the emergence-side pupil'.

In the optical system 100 according to the first embodiment, a light ray 108 which is incident on the negative refraction lens 101 is reflected by the compensating component 106, and after being refracted at the emergence-side pupil 112, reaches the image point 105 upon being reflected by the compensating element 106.

When θ becomes even larger (θ is further increased) and tan θ>tan $θ_2$=w/a, as a light ray 36 in FIG. 32, it is not even incident on the negative refraction lens 31. In other words, the light ray is vignetted by the incidence-side pupil.

In FIG. 1 and FIG. 32, a<b, and when a>b, only vignetting by the incidence-side pupil occurs, and it is not vignetted by the emergence-side pupil. However, an argument other than this is held irrelevant to a magnitude correlation of a and b.

In the optical system 100 according to the first embodiment, a light ray 109 is deflected by the compensating element 106, and for example, after being reflected is incident on the negative refraction lens 101, and is emerged from the negative refraction lens 101 after being reflected once again by the compensating element 106, and reaches the image point 105.

Here, an important point is that the image-formation angle when the light ray 108 or the light ray 109 reaches the image point 105 is same as the angle of emergence θ when each of the light rays was emitted from the object point 103. Therefore, it is compensated that a spatial frequency component on the object plane 102 is transferred to the image plane 104 without being changed. In other words, it means that in spite of a fact that the light ray undergoes reflection by the compensating element 106, optical information on the object plane 102 is correctly reproduced (imaged) on the image plane 104.

The number of times for which the light ray emitted from the object point 103 is reflected by the compensating element 106 before reaching the image point 105 is directly proportional to the angle of emergence θ. However, since a physical optical path length in air and in the negative refraction lens is the same all the time, the optical path length from the object point 103 reaching up to the image point 105 becomes zero irrespective of the angle of emergence θ. This is because, the refractive index $n_A$ of air and the refractive index $n_N$ of the negative refraction lens 101 are related by the relation $n_N$=−$n_A$.

Figure 33:
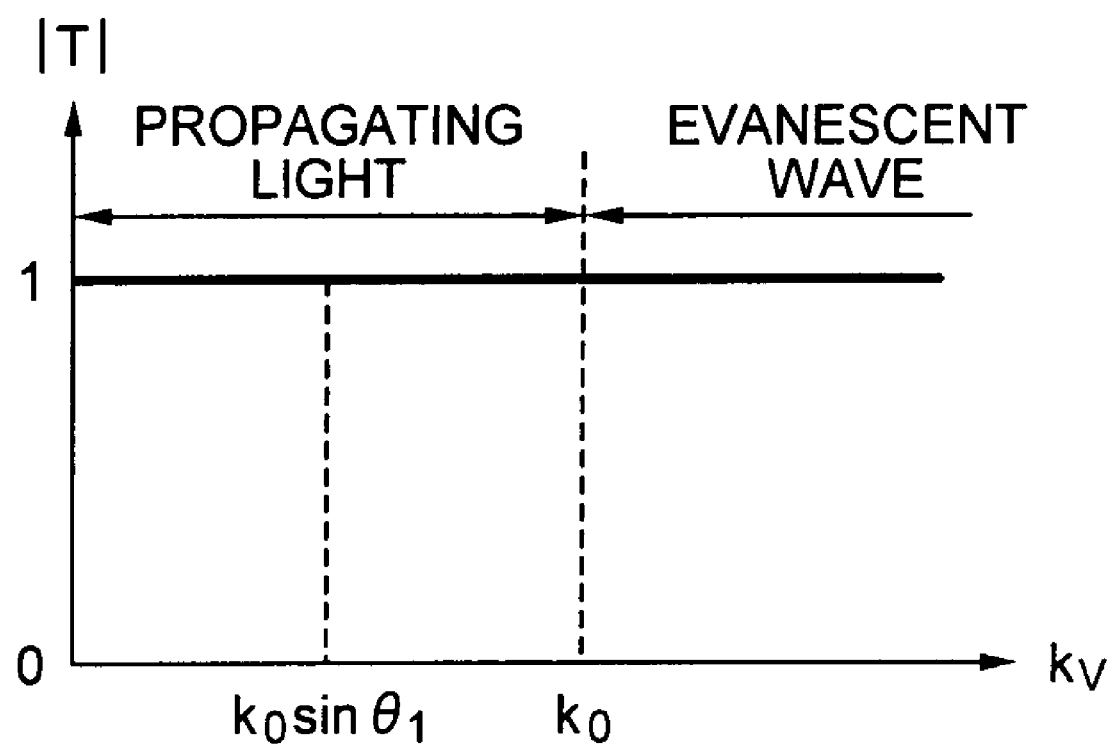
FIG. 33 is a diagram indicating the transfer function when the perfect imaging works out.
Figure 34:
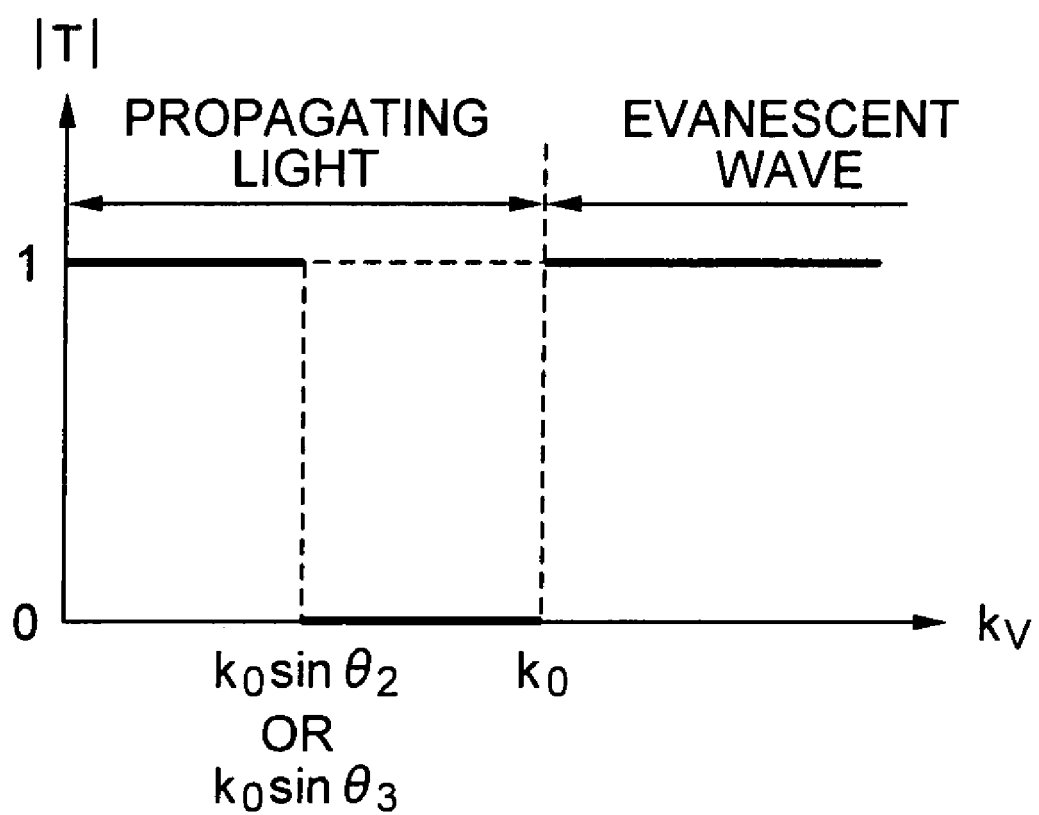
FIG. 34 is a diagram indicating the transfer function by the negative refraction lens.

Regarding the arbitrary angle of emergence θ included in a range 0≦θ<π/2, since the light ray emitted from the object point 102 is formed as an image on the image point 105, an MTF curve of the optical system becomes the same as in FIG. 33, and the perfect imaging or the perfect imaging effect is realized.

Here, some modified embodiments related to the negative refraction lens optical system shown in FIG. 1 will be described. In FIG. 1, the cross-section of the two-dimensional negative refraction lens or the three-dimensional negative refraction lens (with a direction of the diagram as a reference) was symmetrical shaped in a vertical direction, and the object point 103 for which, an axis of symmetry coincides with the optical axis 110 was selected.

Figure 2:
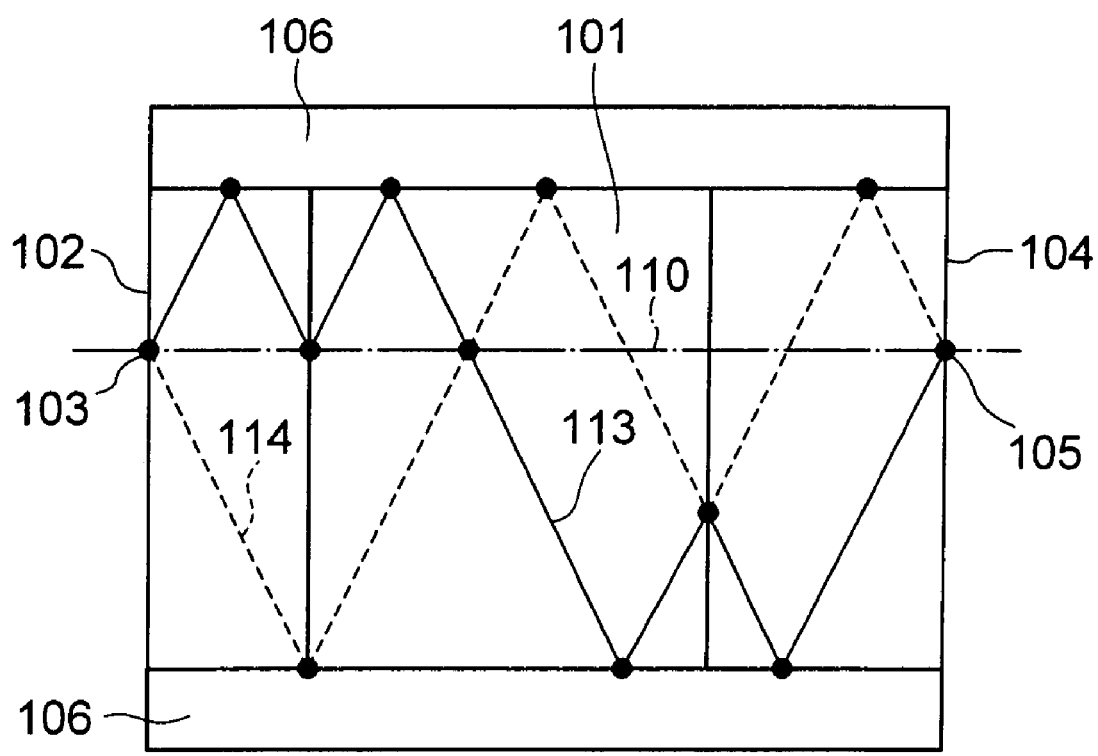
FIG. 2 is a diagram describing the image formation by the optical system according to the first embodiment of the present invention.

Whereas, FIG. 2 is a diagram in which an image forming optical path with respect to the object point 103 having an optical axis different from the axis of symmetry is shown. However, a part of the reference numerals is omitted in the diagram, and the omitted reference numerals are common as the reference numerals in FIG. 1.

Optical paths of a light ray 113 (continuous lines) which is emerged from the object point 103 in an upward direction and a light ray 114 (dotted line) which is emerged in a downward direction at the angle of emergence same as of the light ray 113 are shown. The light ray 113 passes through an order of steps of reflection→refraction→reflection→intermediate image formation→reflection→refraction→reflection.

Moreover, the other light ray 114 passes through an order of steps of refraction→intermediate image formation→reflection→refraction→reflection. Moreover, each of the light ray 113 and the light ray 114 reaches the image point 105. The steps up to the image formation are different but it follows that both the light rays reach the image point 105 at the image-formation angle same as the angle of emergence, and a correct image formation is carried out.

Figure 3:
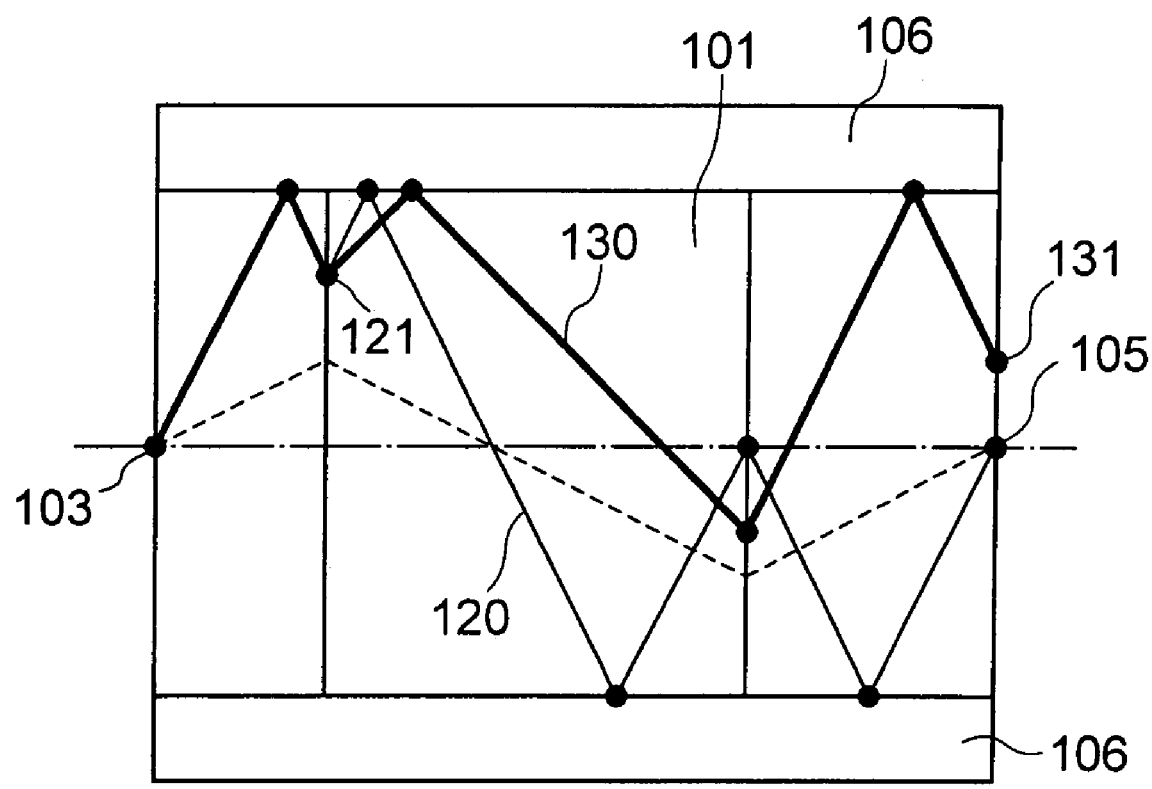
FIG. 3 is a light-ray diagram when a refractive index is mismatching.
Figure 4:
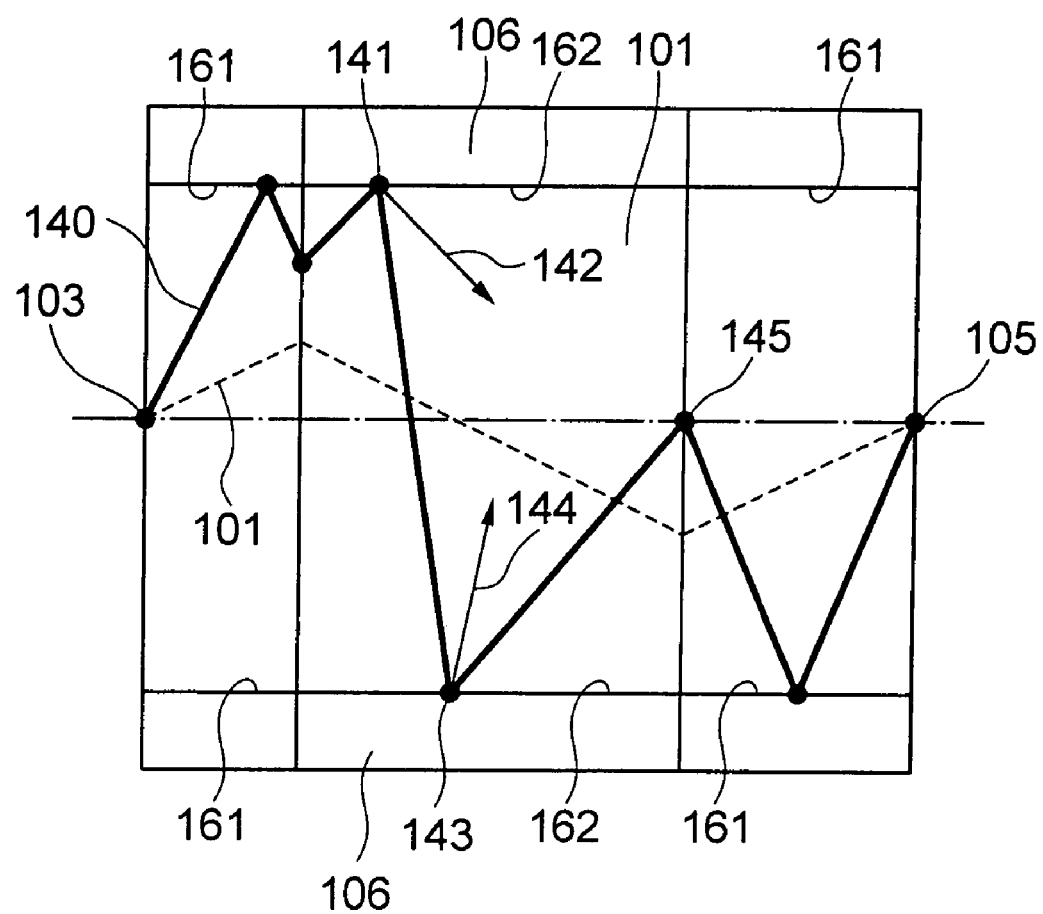
FIG. 4 is a light-ray diagram when a diffraction grating is used as a compensating element.
Figure 5:
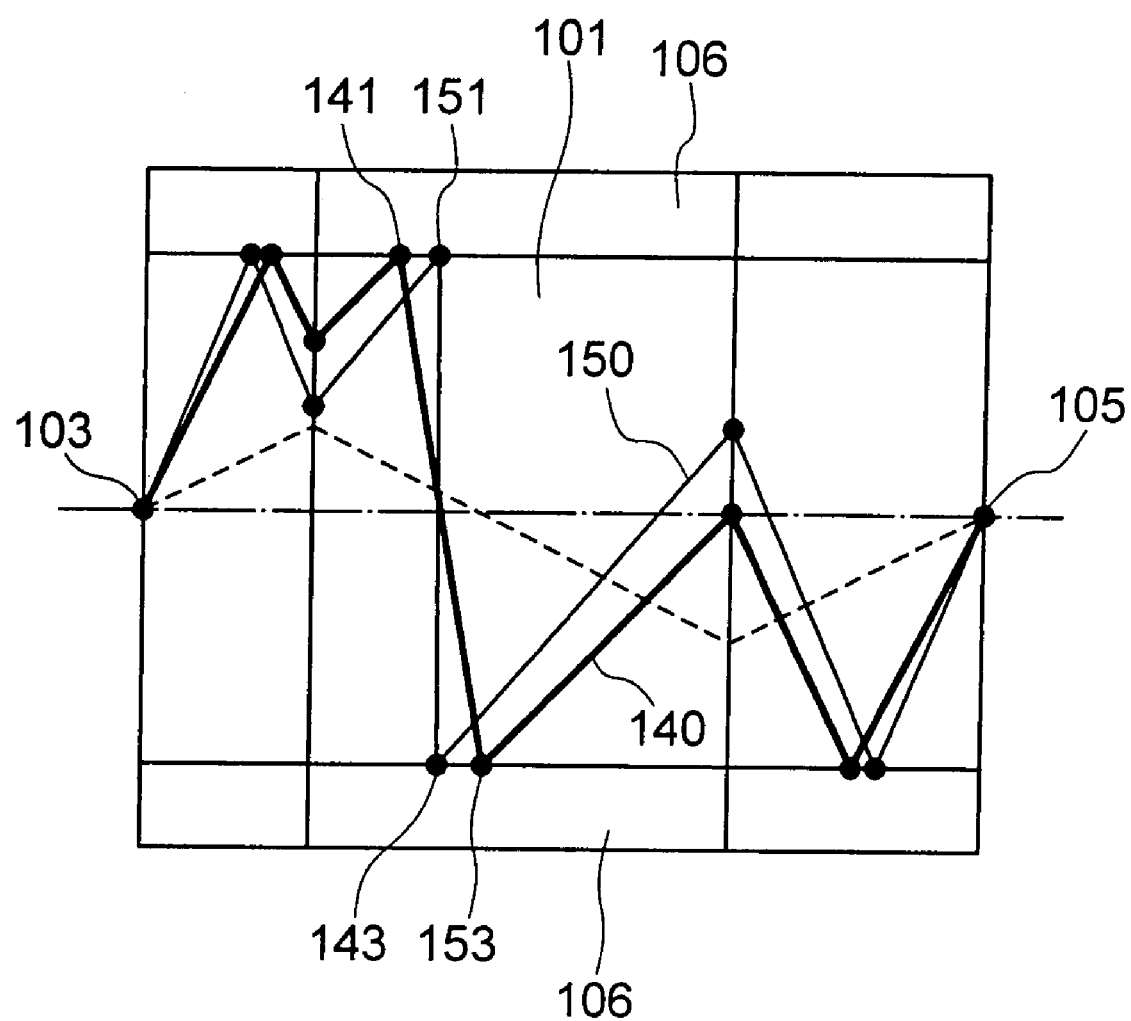
FIG. 5 is a light-ray diagram when a diffraction grating is used as a compensating element.

FIG. 3 to FIG. 5 are diagrams for describing other modified embodiments, and a part of the reference numerals common in FIG. 1 are omitted. Moreover, a light ray with a small angle of emergence, which reaches the image point 105 without being reflected, is shown by dotted lines, for reference.

FIG. 3 is a diagram in which an optical path when the relationship $n_N$=−$n_A$ which has to be satisfied by the refractive index $n_A$ of air and refractive index $n_N$ of the negative refraction lens 101 is not satisfied, and when $n_A$>0, and $n_N$<0, and |$n_N$|<|$n_A$|. When the condition $n_N$=−$n_A$ is satisfied, the light ray is supposed to follow the optical path as of a light ray 120, and contribute to the image formation, but since the condition $n_N$=−$n_A$ is not satisfied, a light ray 130 reaches a point 131 which is different from the image point 105. In this manner, a reason why the light ray 130 doesn't contribute correctly to the image formation is because the angle of refraction is changed due to mismatching of the refractive index in a step of refraction at a point 121.

FIG. 4 shows almost a same optical system as in FIG. 1 to FIG. 3, and differs at a point that a part of the compensating element 106 is formed by a diffraction grating and not by a mirror. An exposed portion of the compensating element 106, in other words, a portion which is not in contact with a negative refraction lens 101 is formed by a mirror 161, and a portion in contact with the negative refraction lens 101 is formed by a diffraction grating 162.

The diffraction grating 162 is a reflection type diffraction grating, and is formed such that a zero-order diffracted light (reflected light) with respect to a light ray 140 which is incident at a point 141 is emerged in a direction of a light ray 142, and a negative first-order diffracted light is emerged in a direction of a point 143. Similarly as at the point 143, the zero-order diffracted light is emerged in a direction of a light ray 144, and a positive first-order diffracted light is emerged in a direction of a point 145. In this manner, the diffraction grating 162 deflects light by diffracting.

Furthermore, after the light ray 140 is refracted at the point 145, it follows the same optical path as the optical path of the light ray 120 in FIG. 3, in other words, contributes correctly to the image formation. The zero-order diffracted light 142 and the zero-order diffracted light 144 at the point 141 and the point 143, become noise in the image formation, and are not preferable. Therefore, it is preferable to design a shape, a cycle, and a depth of the diffraction grating such that these zero-order diffracted lights become sufficiently small.

It is also possible to form the portion of the compensating element 106, which is in contact with the negative refraction lens 101, by a volume hologram. Generally, in the volume hologram, there is a design condition that a diffraction efficiency of the first-order diffracted light becomes 100%

(Kogelnik's theory of coupled waves), by designing such that this condition is satisfied, it is possible to eliminate the zero-order diffracted light 142 and the zero-order diffracted light 144 which become cause of the noise, and it is more preferable.

The diffraction grating and the volume hologram can also be considered as a zero-dimensional and one-dimensional photonic crystal in a wider sense, and when a two-dimensional or a three-dimensional photonic crystal is used, since it is possible to control the diffracted light more accurately, it is even more preferable.

FIG. 5 is a diagram in which a light ray 150 corresponding to the same object point 103, and having a different angle of emergence is shown to be matched with the light ray 140 for which the image-formation (relationship) is compensated by the compensating element 106 in FIG. 4. A light ray having a different angle of incidence, emitted from the same object point in this manner is reflected (diffracted) at a different point on the compensating element 106. Therefore, it is possible to adjust a structure of the compensating element such that a desired angle of reflection (diffraction) is achieved at a corresponding reflection (diffraction) point.

In FIG. 5, by causing to differ a design of the diffraction grating at the point 141 and a point 151, or at the point 143 and a point 153, it is possible to realize an optical path such as the ray shown in the diagram, and to make each light ray contribute correctly to the image formation.

Since both FIG. 4 and FIG. 5 are possible modified embodiments when a position of the object point 103, consequently a position of the image point 105 is specific, and an application range there of is limited, but is superior at a point that it is possible to have a correct image formation even when there is a mismatching of the refractive indices of a medium which is outside, and the negative refraction lens.

Next, an embodiment in which an improvement in an image-forming performance by the compensating element is evaluated quantitatively will be described below. FIG. 6 to FIG. 11 are diagrams in which light bearing various frequency components subjected to image formation by the optical system in FIG. 1, contributing to the image formation is shown. The conditions for the perfect imaging $n_N = -n_A$ and d=a+b are considered to be satisfied, but here, further a=b=d/2 let to be held true.

The propagating light which is transferred in the optical system 100 is subjected to refraction at the negative refraction lens surface (the incidence-side pupil 111 and the emergence-side pupil 112), and reflection at the compensating element 106. An amplitude transmittance at the time for refraction is let to be T, and an amplitude reflectance at the time of reflection is let to be R; and it is supposed that there is no factor (such as an absorption and a scattering) other than these to have an effect on the transfer efficiency (propagation efficiency) of light. Consequently, when the number of refractions and reflections in the optical path are let to be $N_T$ and $N_R$ respectively, the transfer efficiency in the entire optical path will be given by the following numerical expression (1).

$$E_{\!f\!f} = T^{N_T} R^{N_R} \quad (1)$$

Figure 6:
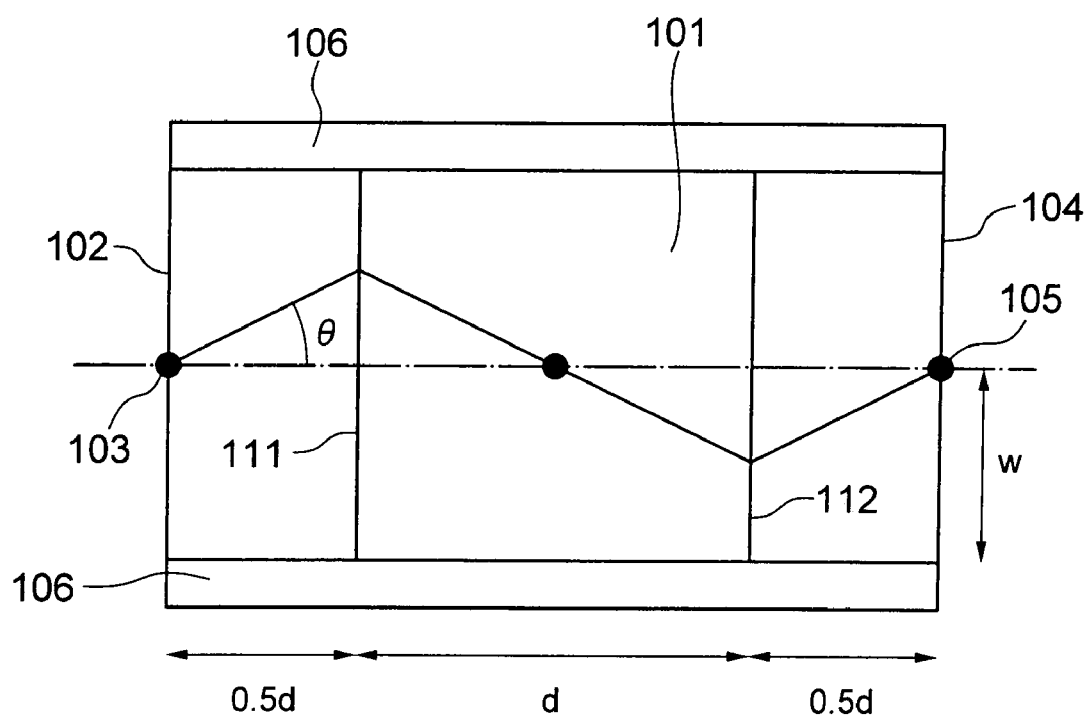
FIG. 6 is a diagram describing a reflection of a light ray by the compensating element.

FIG. 6 shows a transfer of propagating light bearing information of the lowest spatial frequency included on the object plane 102, from the object plane 102 up to the image plane 104. Light which has emitted from the object point 103 on the object plane 102 is refracted twice at the incidence-side pupil 111 and the emergence-side pupil 112, and reaches the image point 105 on the image plane 104. Consequently, for the light ray shown in FIG. 6, $E_{\!f\!f} = T^2$.

Figure 7:
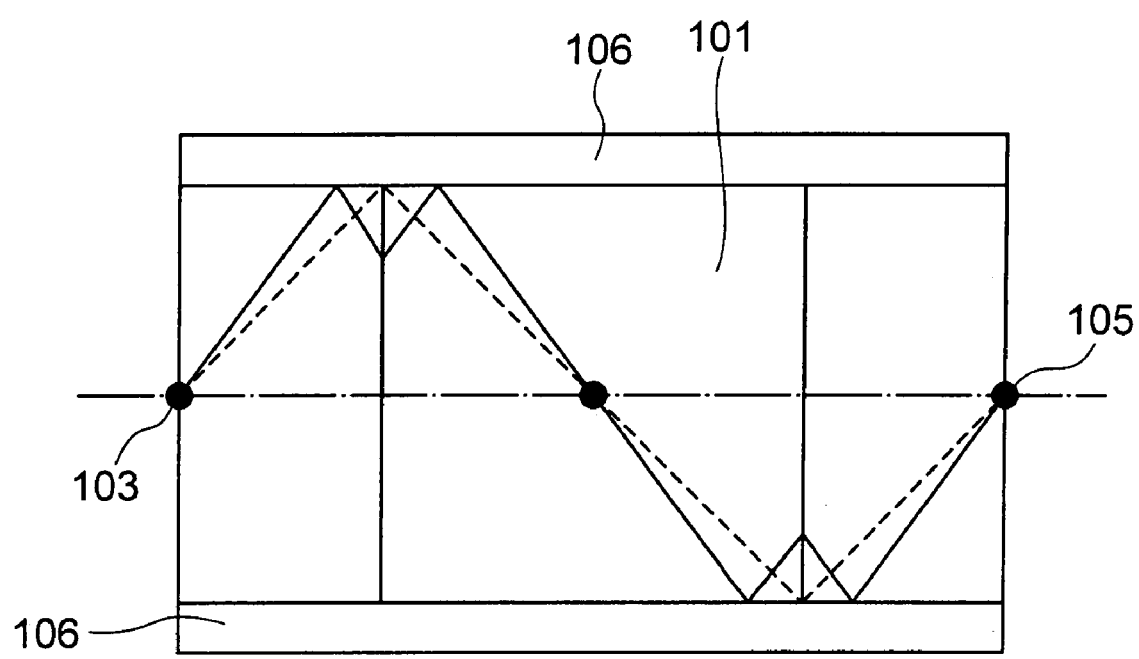
FIG. 7 is a diagram describing the reflection of the light ray by the compensating element.

When the angle of emergence θ from the object point 103 is increased and exceeds $\tan^{-1}(2w/d)$, as shown by continuous lines in FIG. 7, the light is subjected to the refraction twice and the reflection four times before reaching the image point 105. Dotted lines in FIG. 7 show a case of $\theta = \tan^{-1}(2w/d)$. Consequently, regarding a light ray (continuous lines) shown in FIG. 7, the transfer efficiency becomes $E_{\!f\!f} = T^2 R^4$. In FIG. 4 to FIG. 7, a reference numeral of each section is common as a reference numeral in FIG. 6.

Figure 8:
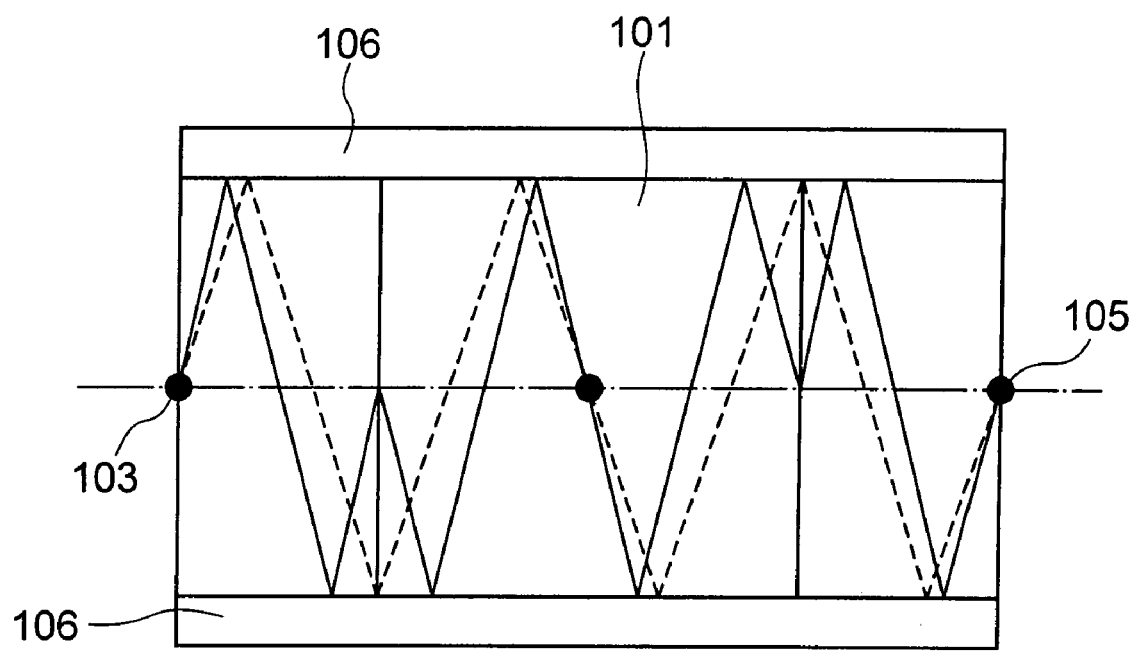
FIG. 8 is a diagram describing the reflection of the light ray by the compensating element.

When θ is increased further and exceeds $\tan^{-1}(6w/d)$, as shown by continuous lines in FIG. 8, the light is subjected to the refraction twice and the reflection eight times before reaching the image point 105. Dotted lines in FIG. 8 show a case of $\theta = \tan^{-1}(6w/d)$.

Figure 9:
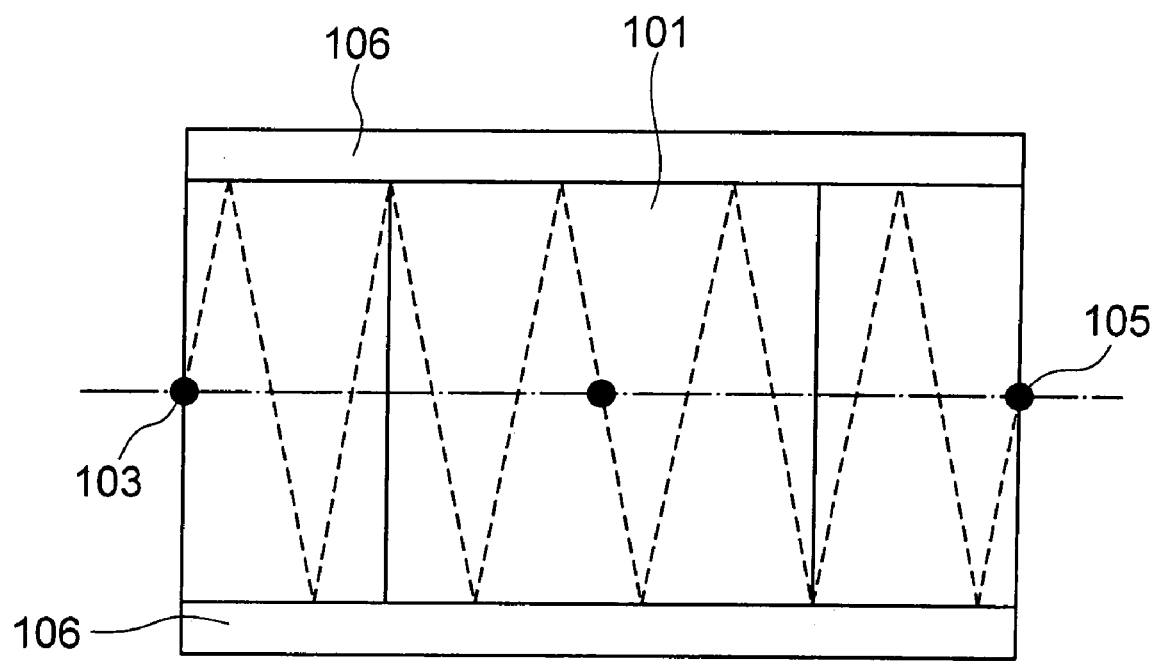
FIG. 9 is a diagram describing the reflection of the light ray by the compensating element.
Figure 10:
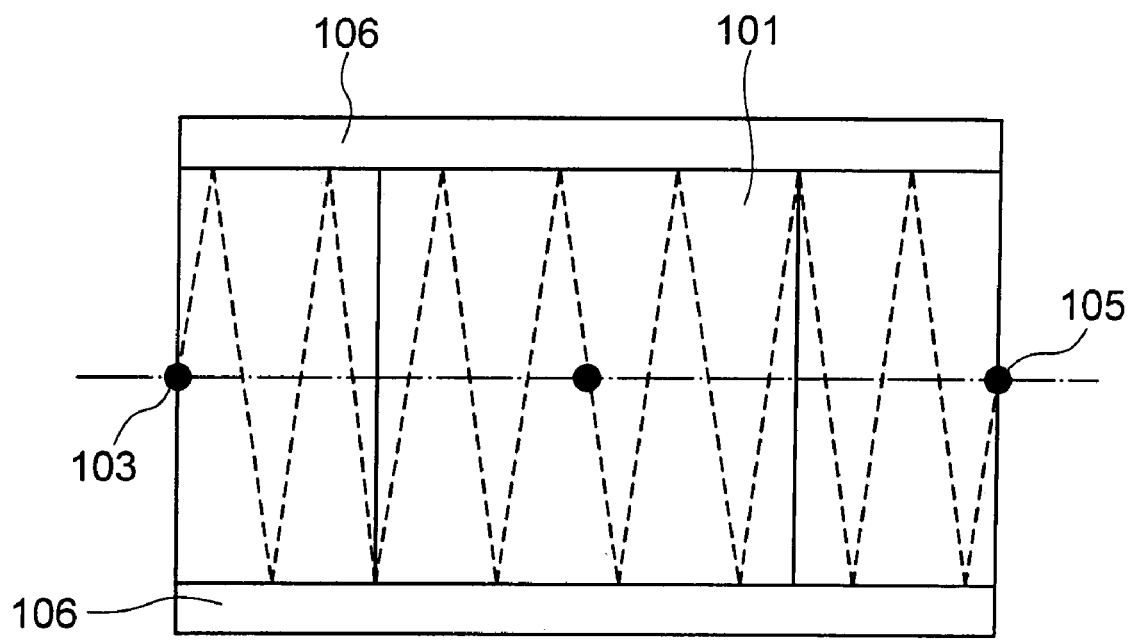
FIG. 10 is a diagram describing the reflection of the light ray by the compensating element.
Figure 11:
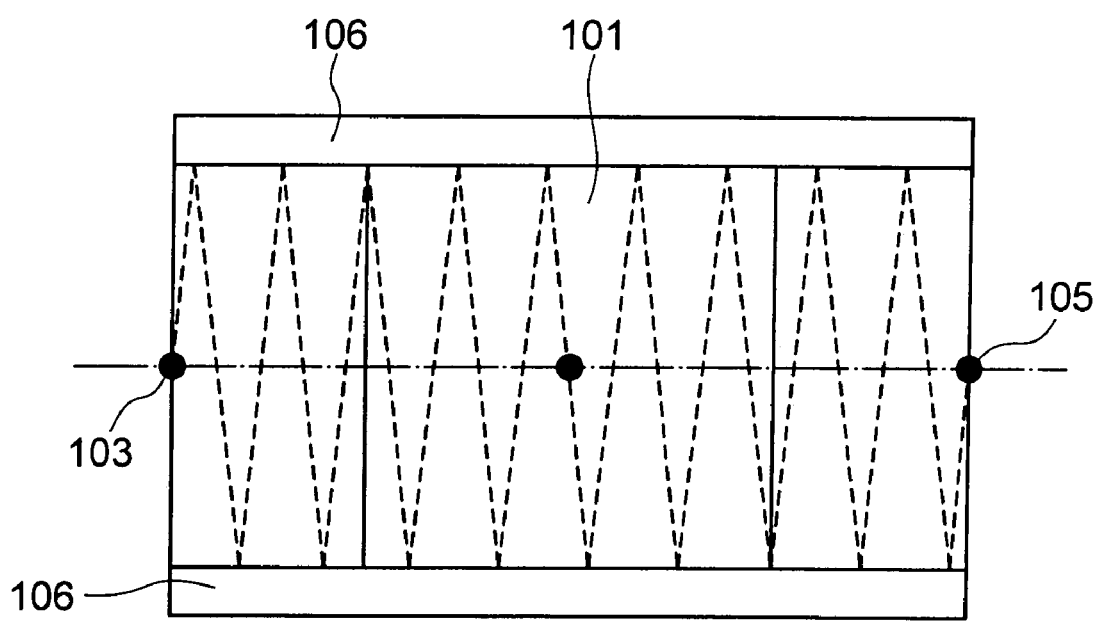
FIG. 11 is a diagram describing the reflection of the light ray by the compensating element.

A case in which, θ is increased further can also be considered similarly, and each of FIG. 9, FIG. 10, and FIG. 11 is a diagram in which an optical path corresponding to each of $\theta = \tan^{-1}(10w/d)$, $\theta = \tan^{-1}(14w/d)$, and $\theta = \tan^{-1}(18w/d)$ is shown.

When the angle of emergence θ becomes greater than the optical path (dotted lines) shown in FIG. 9, FIG. 10, and FIG. 11, the light is subjected to the reflection 12 times, 16 times, and 20 times respectively. It is not shown in the diagram, but when θ becomes greater than $\tan^{-1}(22w/d)$, the light ray repeats the reflection for 24 times.

Figure 12:
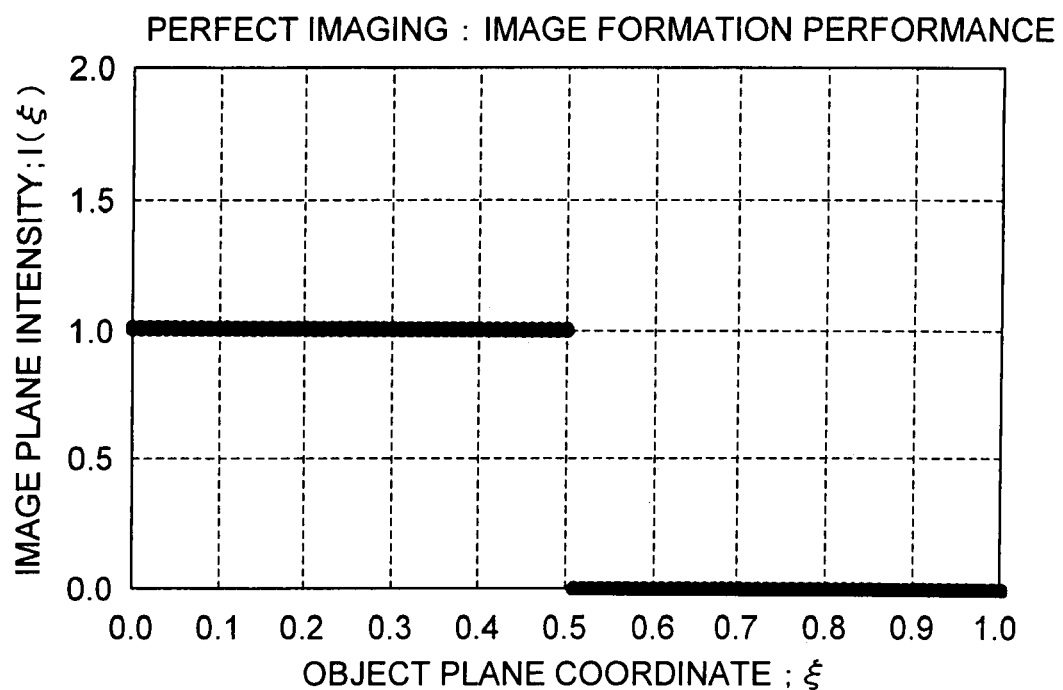
FIG. 12 is a diagram showing an intensity distribution on an image plane when a perfect imaging works out.

For evaluating numerically the image-formation performance of the optical system 100, a case in which a step-wise intensity distribution as shown in FIG. 12 is placed on the object plane 102 is taken into consideration. Here, object plane coordinates ξ are let to be dimensionless coordinates in which real coordinates are standardized by a wavelength, (in the diagram no other range except 0<ξ<1 is shown) the intensity distribution is let to be an even function. In other words, it is a step having a width exactly the same as the wavelength.

Corresponding to the standardization of the real coordinates x, the wave-number k is also standardized as $k = \kappa \lambda / 2\pi$. A Fourier transformation (and an inverse transformation) of dimensionless ξ and κ is indicated by numerical expression (2) and (3)

$$f(\xi) = \int_{-\infty}^{\infty} F(\kappa) \exp(2\pi i \kappa \xi) d\kappa \quad (2)$$

$$F(\kappa) = \int_{-\infty}^{\infty} f(\xi) \exp(-2\pi i \kappa \xi) d\xi \quad (3)$$

For carrying out a numerical integration practically, it is necessary to discretize variables ξ and κ, and in this modified embodiment, a discretization interval of ξ and κ was let to be 0.005 and 0.05 respectively. Moreover, a cut-off frequency of κ was let to be ±10, and a range of κ exceeding −10≦κ≦10 was ignored.

Figure 13A:
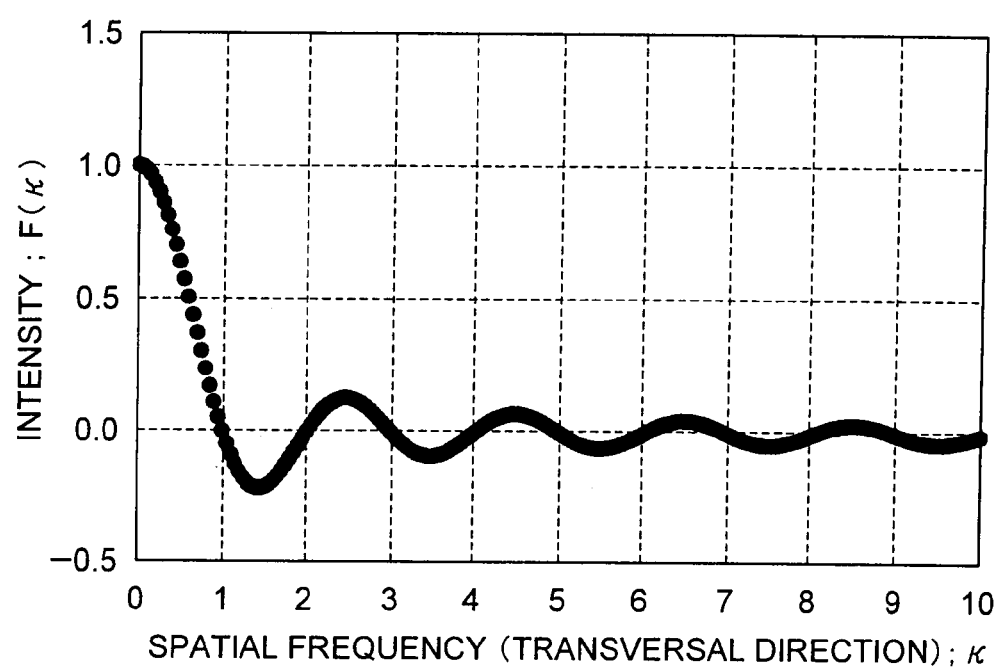
FIG. 13A is a diagram showing a frequency component when there is a perfect imaging effect.
Figure 13B:
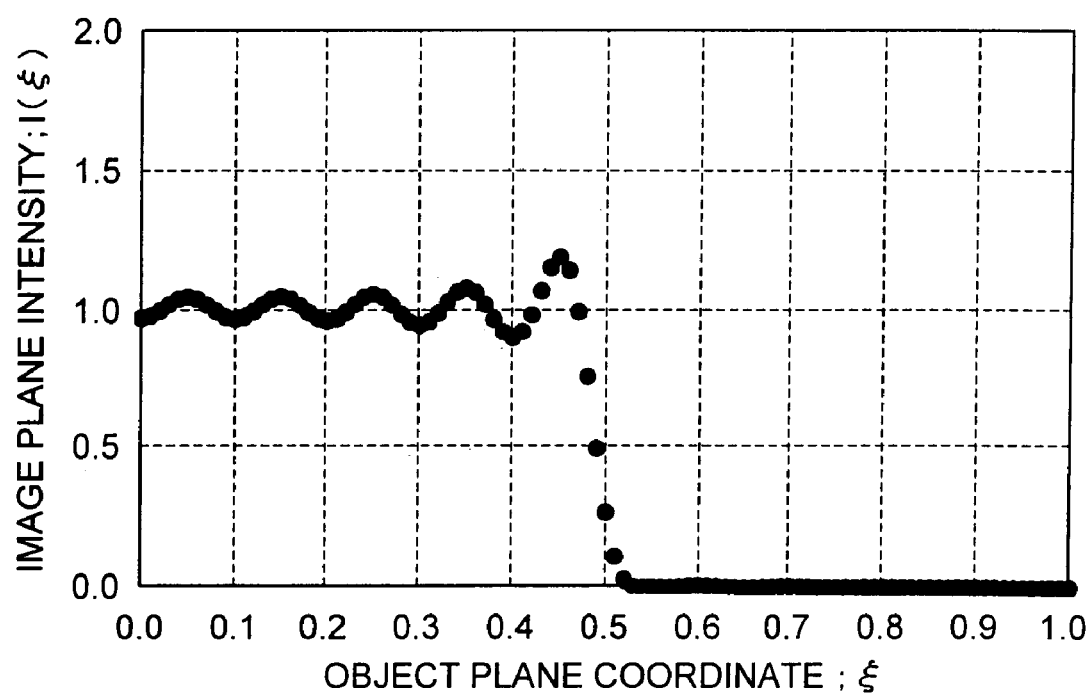
FIG. 13B is a diagram showing the distribution of intensity on the image plane when there is perfect imaging effect.

Based on calculation conditions mentioned earlier, a result when a step form in FIG. 12 was subjected to the Fourier transformation is shown in FIG. 13A, and a result when the step form was subjected to the inverse Fourier transformation, and then squared to find the intensity distribution is shown in FIG. 13B. The reason why a graph in FIG. 13B doesn't become (take) the step form is that the variables are discretized and the cut-off frequency is provided to κ.

Image-formation performance for various MTF characteristics is evaluated below, and in a range of an accuracy of calculation of the numerical integration used here, FIG. 13B becomes a reference for the perfect imaging. However, an image plane intensity I (ξ) is standardized under a condition that an integral value in a range of $-1 \leq \xi \leq 1$ is preserved before and after the Fourier transformation.

In the negative refraction lens 31, light for which the angle of emergence θ is greater than $\theta_3 = \sin^{-1}(NA)$, in other words, a component in which the standardized spatial frequency κ is higher than NA does not reach the image plane. Consequently, the spatial frequency component included in the image formation by the negative refraction lens 31 becomes as in FIG. 14A.

However, $\theta_3$ and NA are let to be $\theta_3 = \tan^{-1}(w/b) = \pi/6$, and NA=0.5. The intensity distribution at the image plane obtained according to this result is obtained by allowing the frequency distribution in FIG. 14A to undergo the inverse Fourier transformation, and then to be squared. Result is shown in FIG. 14B.

Figure 14A:
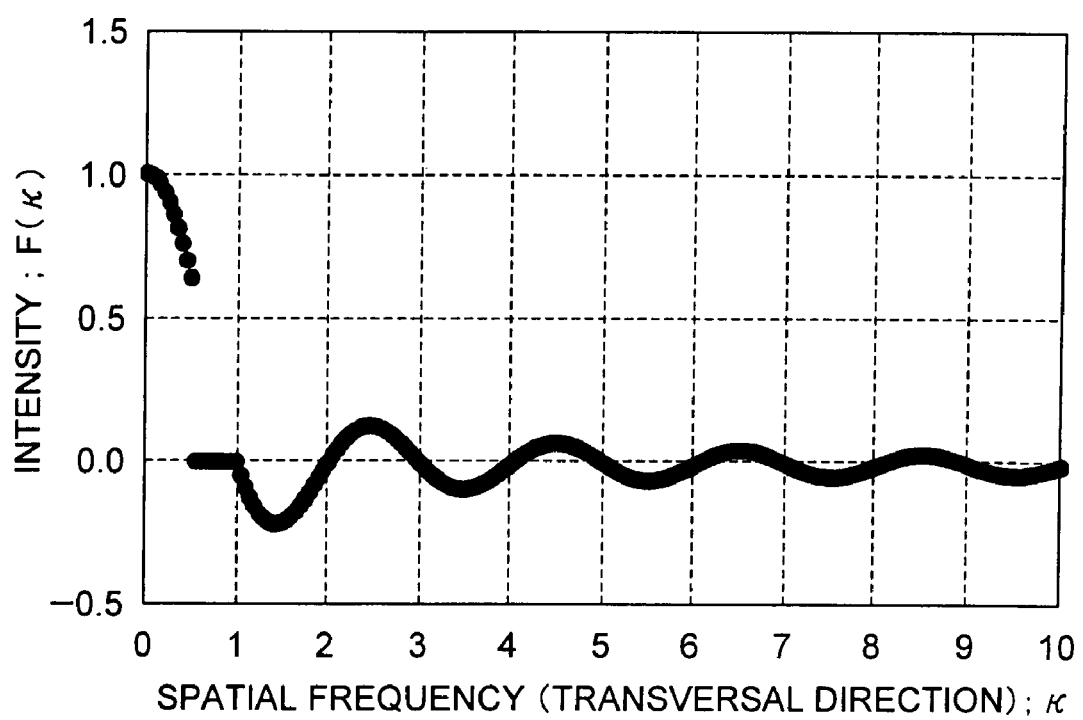
FIG. 14A is a diagrams showing the frequency component when the refractive index is mismatching.
Figure 14B:
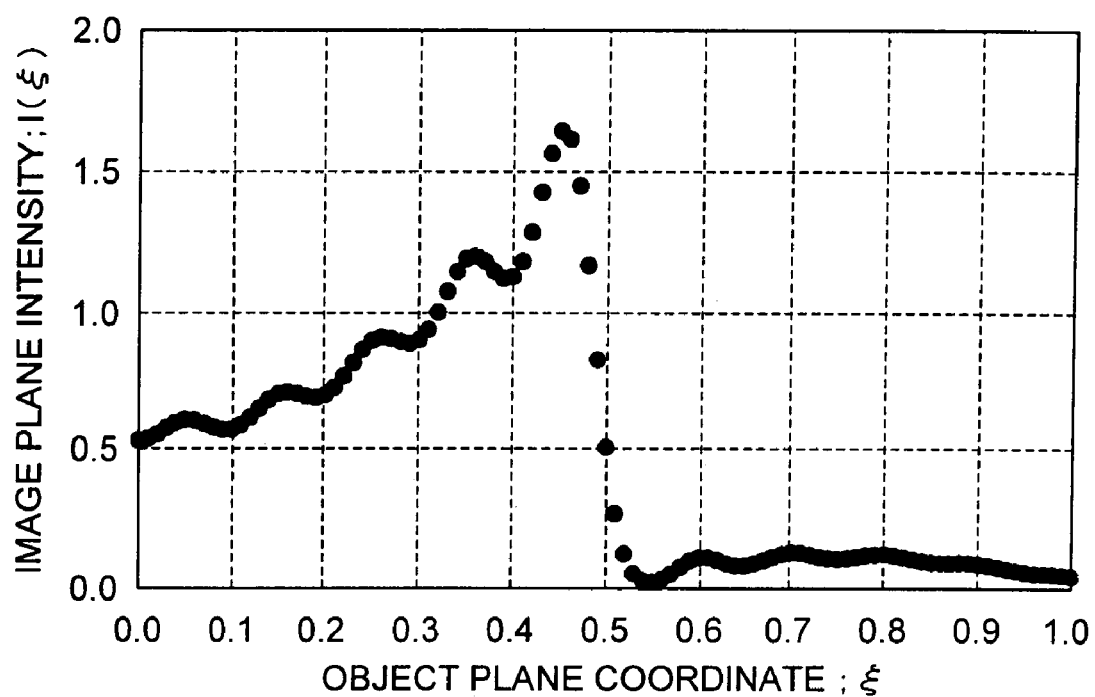
FIG. 14B is a diagram showing the distribution of intensity on the image plane when the refractive index is mismatching.

FIG. 14B shows that it differs substantially from the intensity distribution on the image plane (FIG. 13B) when the perfect imaging is realized, and as to how negative an effect of vignetting the propagating light at the pupil in the negative refraction lens is.

Figure 15A:
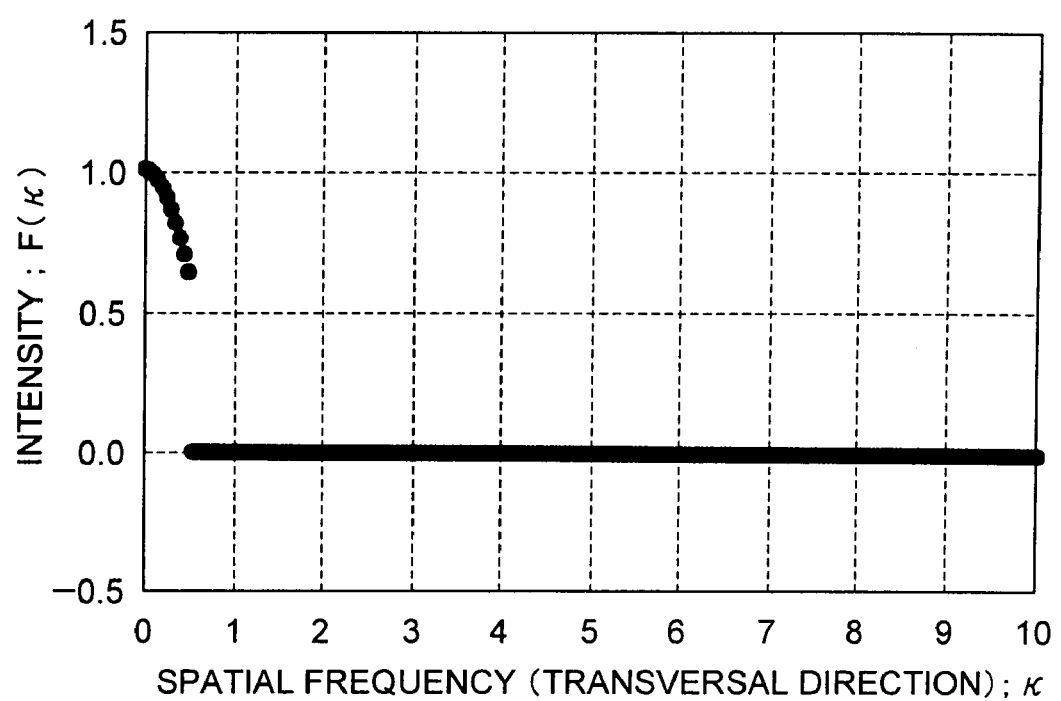
FIG. 15A is a diagram showing the frequency component by a normal conventional lens.
Figure 30:
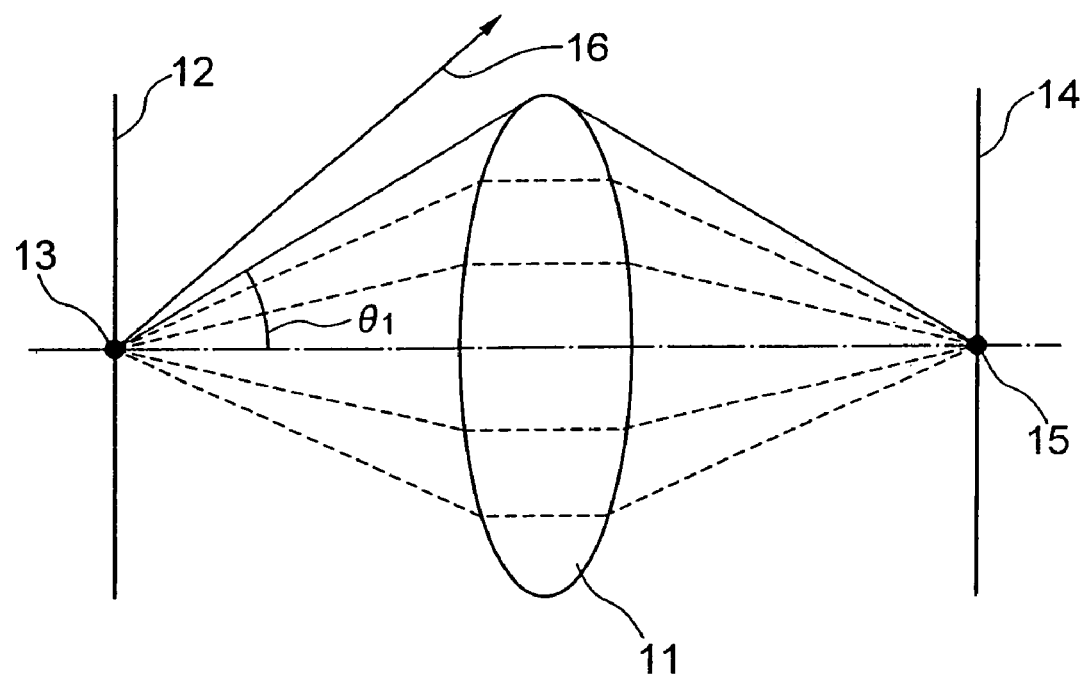
FIG. 30 is a diagram describing the image formation by the normal conventional lens.
Figure 31:
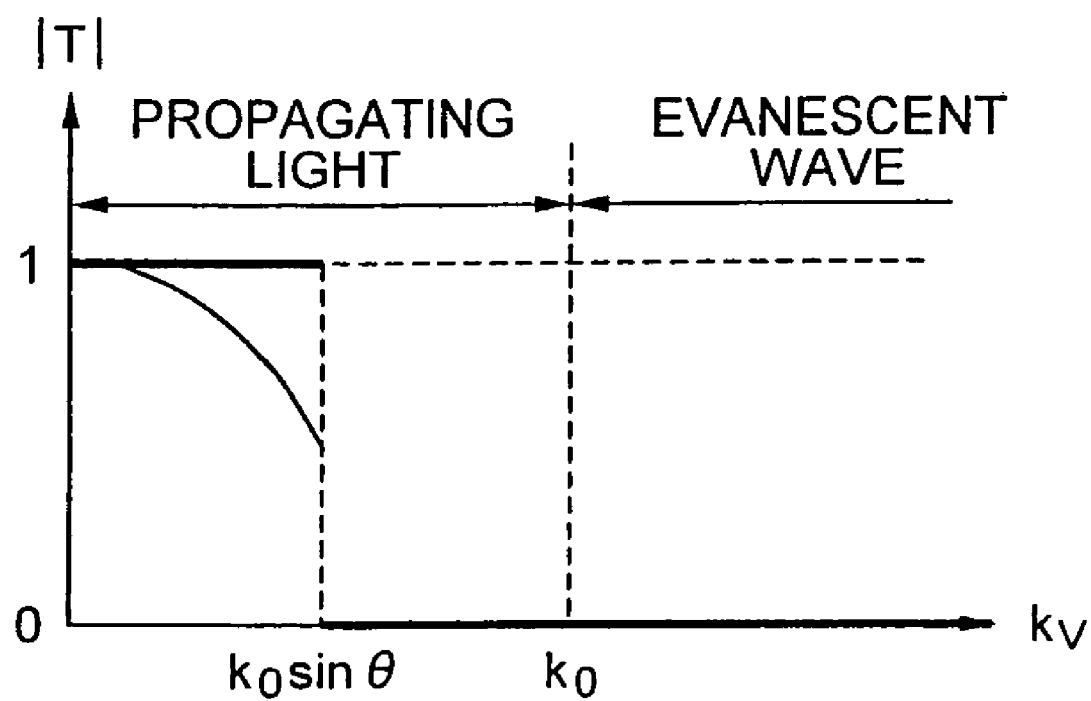
FIG. 31 is a diagram showing a transfer function by the normal conventional lens.

In a normal lens 11 shown in FIG. 30, since a evanescent wave having κ>1 does not contribute to the image formation, when NA is let to be NA=0.5 similarly as in FIG. 14A, the spatial frequency component included in the image formation becomes as in FIG. 15A. The intensity distribution at the image plane achieved by this result is achieved allowing the frequency distribution in FIG. 15A to undergo the inverse Fourier transformation, and then squaring. Result is shown in FIG. 15B.

Figure 15B:
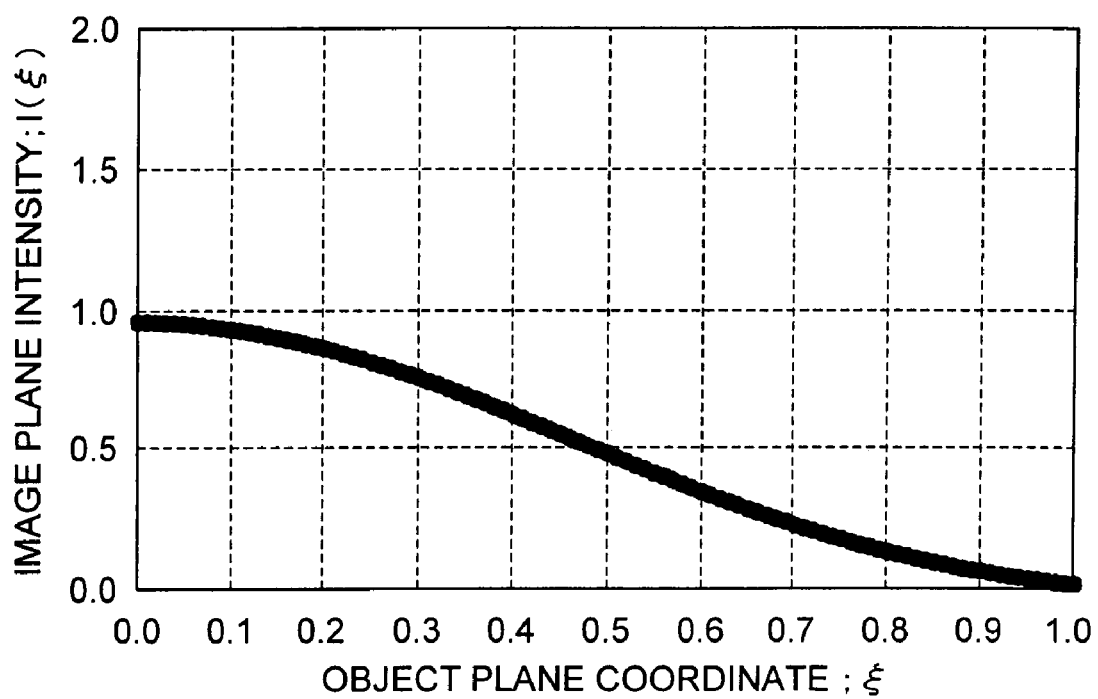
FIG. 15B is a diagram showing the distribution of intensity on the image plane by the normal conventional lens.

FIG. 15B shows an image formation of an optical system restricted by the so-called diffraction limit, and according to a diffraction theory, is an intensity distribution which is a square of sinc function. It is obvious that with respect to the image-formation performance equivalent to the perfect imaging (FIG. 12) or the perfect imaging effect (FIG. 13B), image-formation performance of the diffraction limit (FIG. 15B) and the negative refraction lens (FIG. 14B) not having a compensating mirror is declined.

As characteristics of the optical system according to the present invention, it is desirable that it is superior to the image-formation performance indicated by the intensity of the image plane in FIG. 14B or FIG. 15B.

In the optical system in FIG. 1 or in FIG. 6, table 1 is a table in which a relationship between the angle of emergence θ when the light is emitted from the object point 103 and the transfer efficiency $E_{ff}$ is shown.

TABLE 1

|  | | | | Transfer efficiency $E_{ff}$ | | | |
|---|---|---|---|---|---|---|---|
| κ | tan θ | $N_R$ | $N_T$ | 0% | 80% | 90% | 100% |
| κ0 | 0.000 | 0.000 | 0 | 2 | 0.000 | 1.000 | 1.000 | 1.000 |
| κ1 | 0.500 | 0.577 | 4 | 2 | 0.000 | 0.410 | 0.656 | 1.000 |
| κ2 | 0.866 | 1.732 | 8 | 2 | 0.000 | 0.168 | 0.430 | 1.000 |
| κ3 | 0.945 | 2.887 | 12 | 2 | 0.000 | 0.069 | 0.282 | 1.000 |
| κ4 | 0.971 | 4.041 | 16 | 2 | 0.000 | 0.028 | 0.185 | 1.000 |
| κ5 | 0.982 | 5.196 | 20 | 2 | 0.000 | 0.012 | 0.122 | 1.000 |
| κ6 | 0.988 | 6.351 | 24 | 2 | 0.000 | 0.005 | 0.080 | 1.000 |
| κ7 | 0.991 | 7.506 | 28 | 2 | 0.000 | 0.002 | 0.052 | 1.000 |

Figure 16:
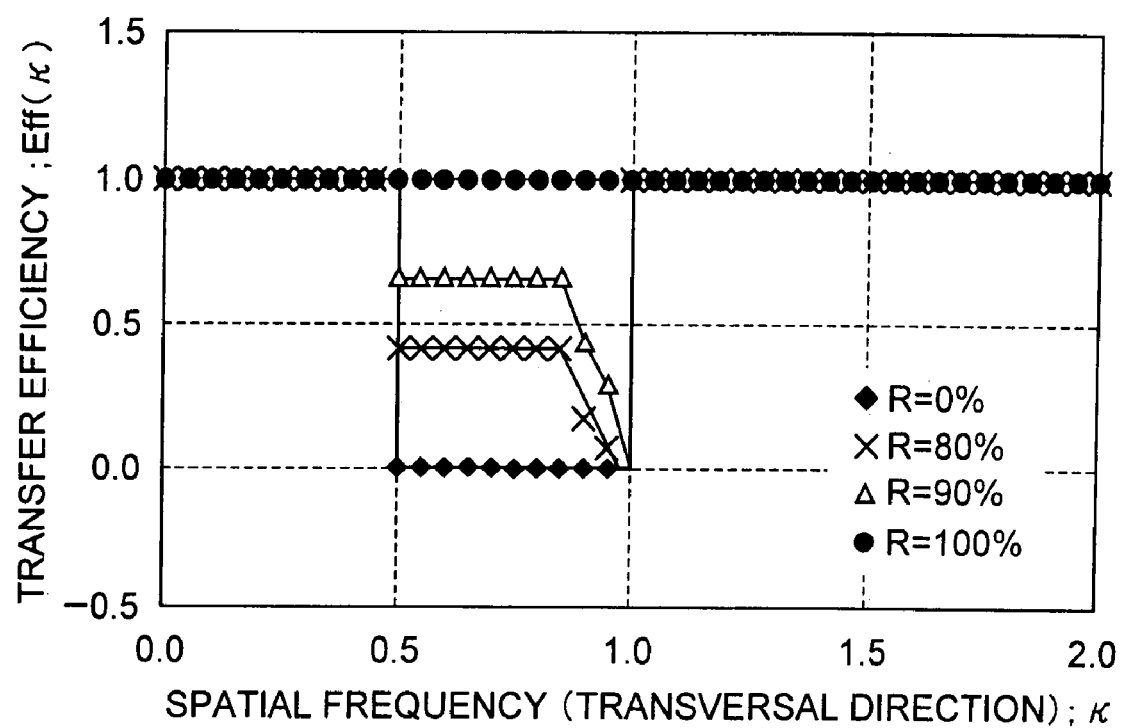
FIG. 16 is a diagram showing a transfer efficiency in the optical system of the present invention.
Figure 17:
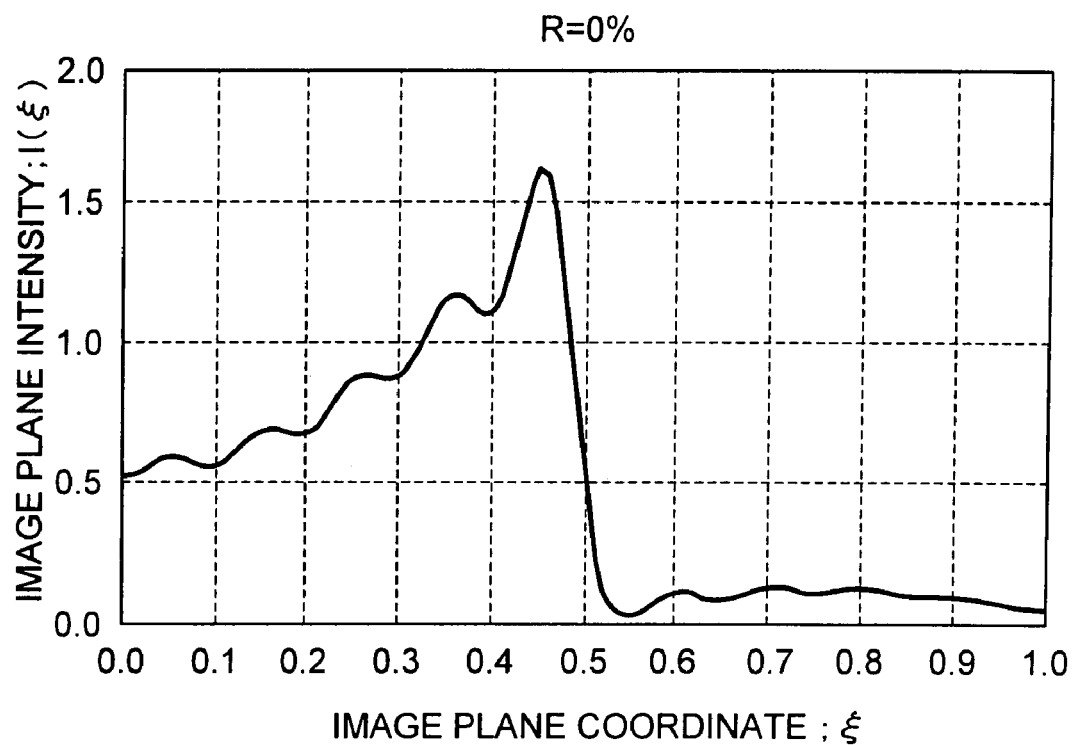
FIG. 17 is a diagram showing the distribution of intensity on the image plane by the optical system of the present invention.

Here, the numerical aperture NA which is determined by the incidence-side pupil 111 is let to be NA=0.5, in other words, $w/d = 1/(2 \times 3^{1/2})$, and the amplitude transmittance T in the surface of the negative refraction lens 101 is let to be T=100%, and calculation was carried out for four cases in which the amplitude reflectance R of the compensating element 106 is R=0%, 80%, 90%, and 100%. The transfer efficiency $E_{ff}$ in each of the cases is shown in FIG. 16.

Moreover, for each case, the result of calculating the image plane intensity upon carrying out the inverse Fourier transformation is shown in FIG. 17 to FIG. 20. When R=0%, since there is no change at all in the transfer efficiency compared to a case in FIG. 14, the image plane intensity has exactly the same distribution. As the amplitude reflectance of the compensating element 106 becomes higher and the image-formation performance is improved, and at R=100%, it matches with a case of the perfect imaging effect (FIG. 13B)

It is evident from the calculation results in a calculation process of the transfer efficiency $E_{ff}$, and calculation results in FIG. 17 to FIG. 20 that when the amplitude reflectance of the compensating element 106 is even slightly higher than R=0%, the effect of the present invention can be anticipated. This is because the transfer efficiency $E_{ff}$ is a monotonically increasing function (refer to expression (1) mentioned above), and a change in the image-formation performance associated with an increase in the amplitude reflectance R is also a continuous change as shown in FIG. 17 to FIG. 20.

Apart from the present invention, a method of correcting by image processing, the spatial frequency component which is declined, after detecting the intensity on the image plane can be taken into consideration. As a spatial filter disposed on a Fourier plane, for a phenomenon in which a decline in the image-formation performance takes a predetermined value according to each spatial frequency, an image quality correction by the image processing is effective.

However, when there is an occurrence of vignetting due to the pupil, which is an issue of the present invention, since a predetermined spatial frequency component is completely lost, it is impossible to restore by a process such as the image processing. On the other hand, by applying the present invention, since it is possible to make the spatial frequency component which is supposed to be lost originally (for example, a component which satisfies $0.5 \leq \kappa \leq 1$ in FIG. 14A) to the image plane, a possibility of restoring all spatial frequencies by applying a correction by the image processing has emerged.

Figure 18:
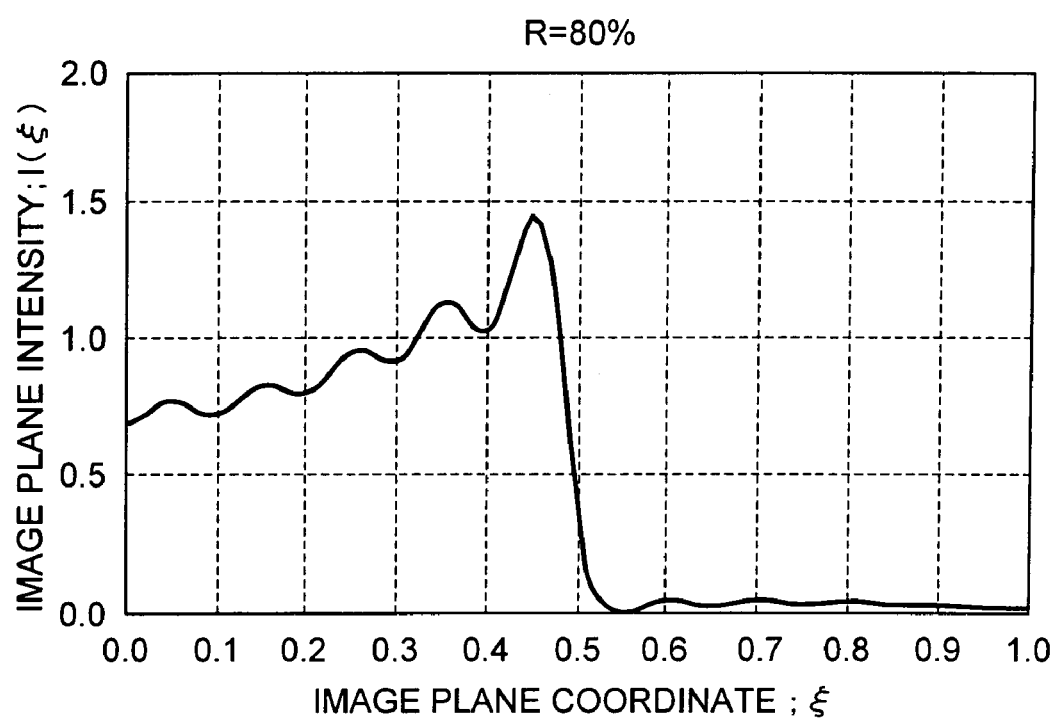
FIG. 18 is a diagram showing the distribution of intensity on the image plane by the optical system of the present invention.
Figure 19:
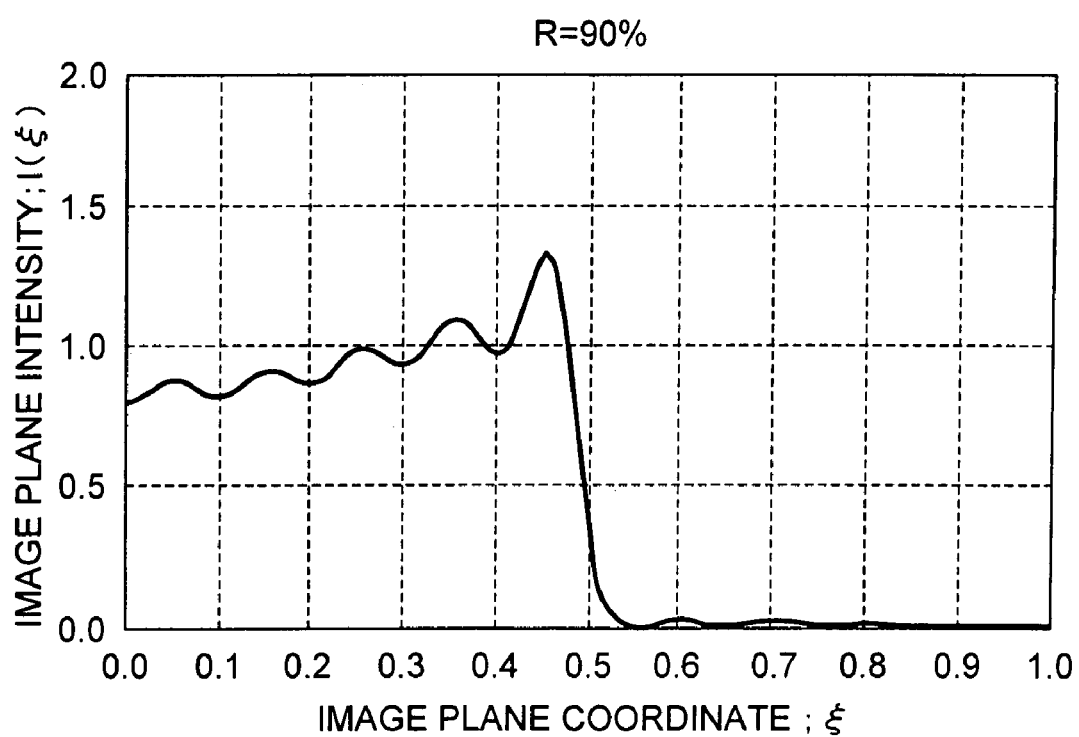
FIG. 19 is a diagram showing the distribution of intensity on the image plane by the optical system of the present invention.
Figure 20:
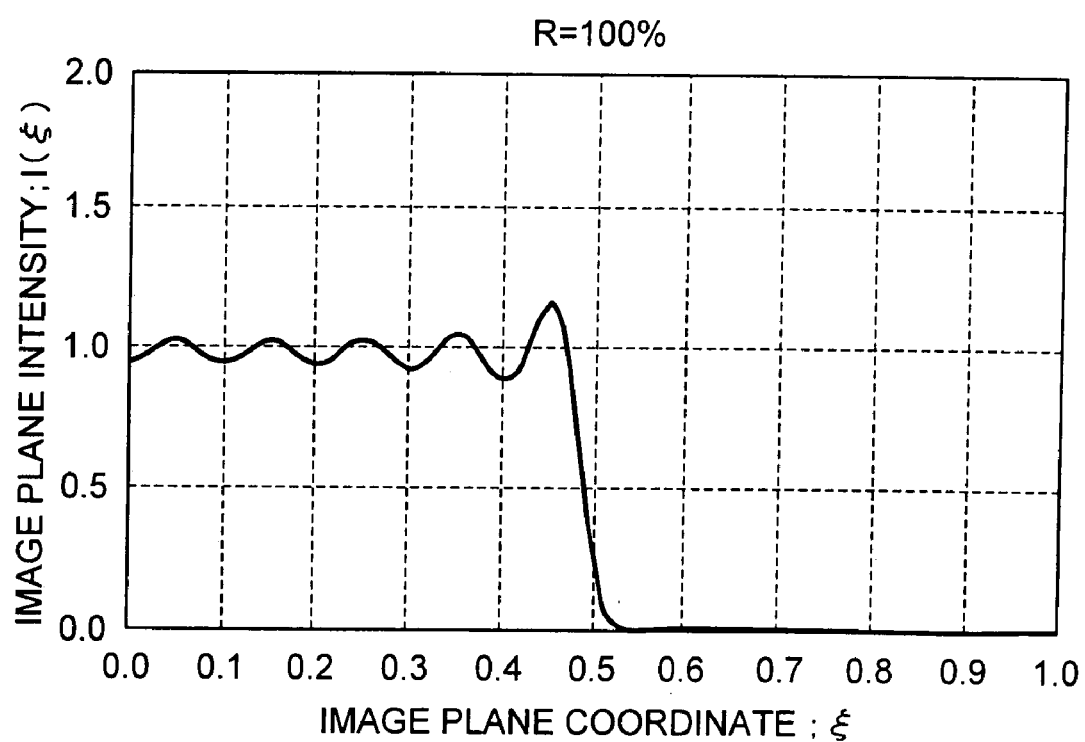
FIG. 20 is a diagram showing the distribution of intensity on the image plane by the optical system of the present invention.

According to an embodiment shown in FIG. 18 to FIG. 20, an amount of the improvement in the image-formation efficiency varies according to the reflectance of the compensating element. The transfer efficiency which is compensated is shown in FIG. 21 by values which are averaged in a range $0.5 \leq \kappa \leq 1$ subjected to compensation.

In this embodiment, for convenience of calculation, the amplitude reflectance R was used. However, since it is normal to use a reflectance $R^2$ with respect to the intensity in a case of explaining a material and a performance of the mirror, a horizontal axis of the graph was let to be $R^2$. It is worth mentioning that, for example, even when the reflectance of the compensating element is low, and an effect due to the present invention is small, by combining a method by the image processing, it is possible to achieve a favorable image quality.

In a realistic image-forming optical system and an image detecting apparatus, there is a scattering and an absorption of light, and various noises caused due to an electronic device etc. It is not possible to determine categorically a preferable intensity for image formation, with respect to a predetermined spatial frequency, but when the light reaches the image plane with the transfer efficiency of about 10% for example, a favorable image quality is maintained.

Figure 21:
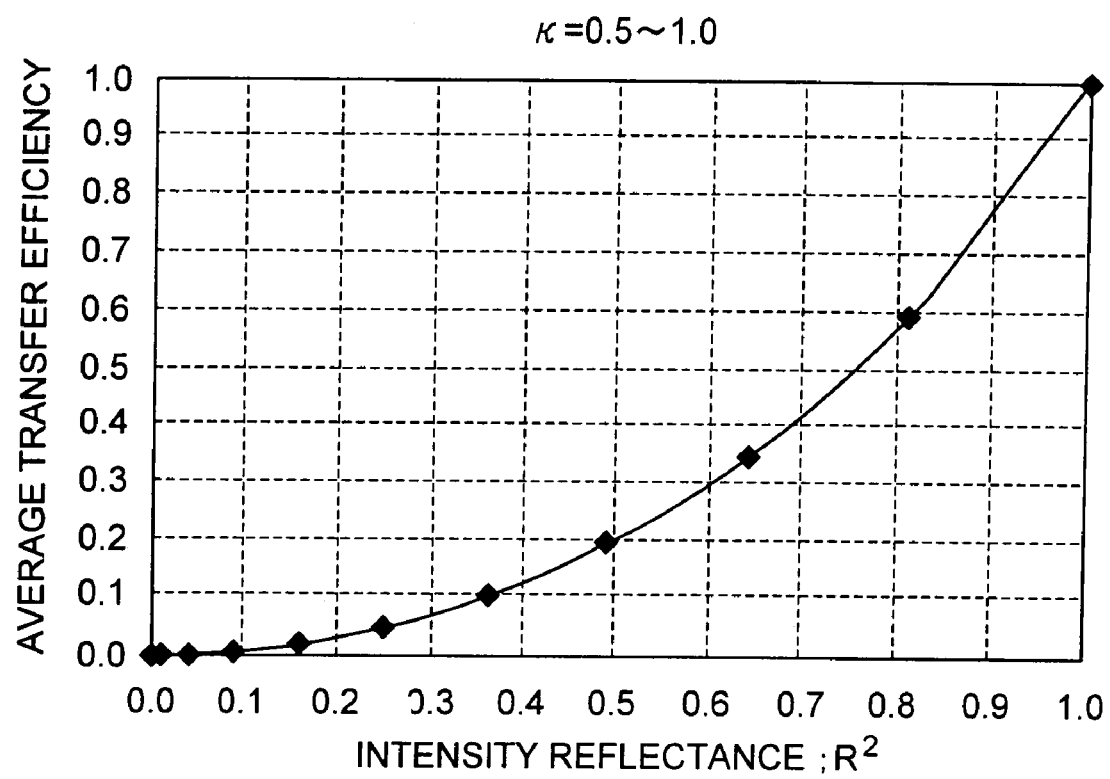
FIG. 21 is a graph showing a relationship between the transfer efficiency and a reflectance of the compensating element.

It has been mentioned earlier that the effect of the present invention can be anticipated provided that the reflectance or the transfer function is not zero, and according to FIG. 21, when the reflectance is higher than 35%, an average value of the transfer function becomes higher than 10%, and a favorable image quality is maintained.

Moreover, when the reflectance is higher than 60%, the average value of the transfer function becomes higher than 30%, and more favorable image quality is maintained. Furthermore, when the reflectance is higher than 80%, the average value of the transfer function becomes higher than 50%, and even more favorable image quality is maintained.

In the embodiments mentioned above, the performance of the optical system is evaluated by using the image-formation performance of a point image, in other words a point which is disposed on an object plane. This, in conventional language of optical technology, is intended for an no aberration optical system. However, a light-ray aberration is primarily a phenomenon caused by a curvature of a lens, and in view of the fact that no aberration whatsoever occurs in a negative refraction lens which satisfies the conditions of the perfect imaging, it may be considered that sufficient number of embodiments are mentioned for describing the effect of the present invention.

In cases such as when the refractive index is mismatching for the negative refraction lens and air, and when the negative refraction lens is formed by a structural material such as a photonic crystal, an aberration similar to a spherical aberration and an astigmatism, or a chromatic aberration may occur. Even in this case, a problem to be solved, in other words the vignetting due to the pupil still exists, and it is possible to improve the image-formation performance by applying the present invention.

Furthermore, when an effect of the light-ray aberration is quite substantial, there is a possibility that the effect of the present invention is small. However, such circumstances may not add up to the perfect imaging effect by the negative refraction lens. Therefore, it is desirable to examine beforehand, correcting favorably various aberrations.

Moreover, in the image formation by the negative refraction lens, since a coma aberration, a distortion, and a field curvature do not occur fundamentally, it may be considered that a performance of a two-dimensional image is determined by the point-image intensity distribution. Due to a similar reason, by using the one-dimensional step-wise image used in this embodiment, it is possible to evaluate the image-formation function of the optical system.

SECOND EMBODIMENT

Figure 22:
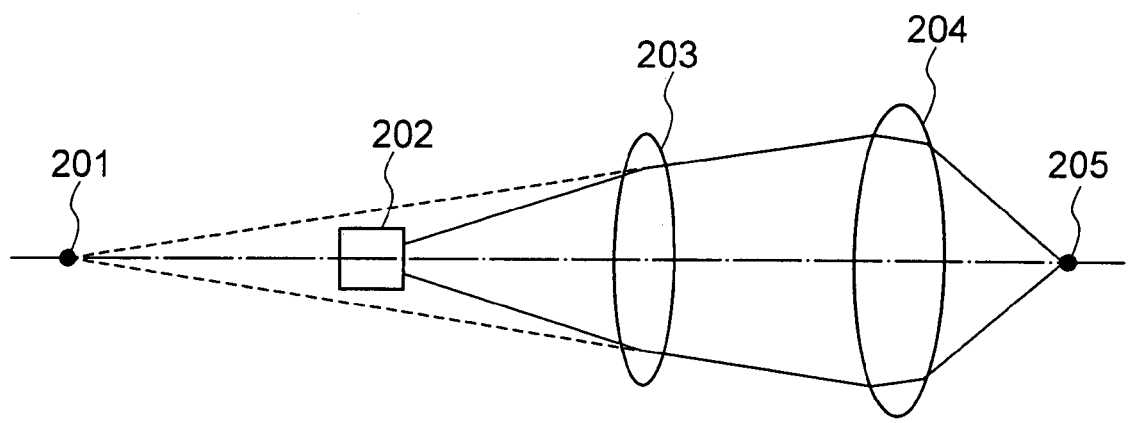
FIG. 22 is a diagram showing an optical pickup using a normal lens.

Next, an optical system according to a second embodiment of the present invention will be described below. The optical system of the second embodiment is applicable easily not only to an image-forming optical system but also to a focusing optical system. For example, FIG. 22 is a diagram in which an optical system of optical pickup is shown. A laser beam which has emitted from a laser beam source 202 after passing through a collimating lens 203, is converged by an objective lens 204 and focused at a focusing point 205.

A recording medium is disposed at a position of the focusing point 205, and digital information is recorded or reproduced. Since the light incident on the objective lens is a spherical wave which has emitted from a virtual point light source 201, the point light source 201 and the focusing point 205 become mutually conjugated points with respect to the objective lens 204.

Further, the point light source 201 corresponds to the object point of the second embodiment and the focusing point 205 corresponds to the image point of the second embodiment. In spite of being an optical pickup of an infinite system, when it is considered that the point-light source is in an infinite direction, exactly similar argument holds true.

Figure 23:
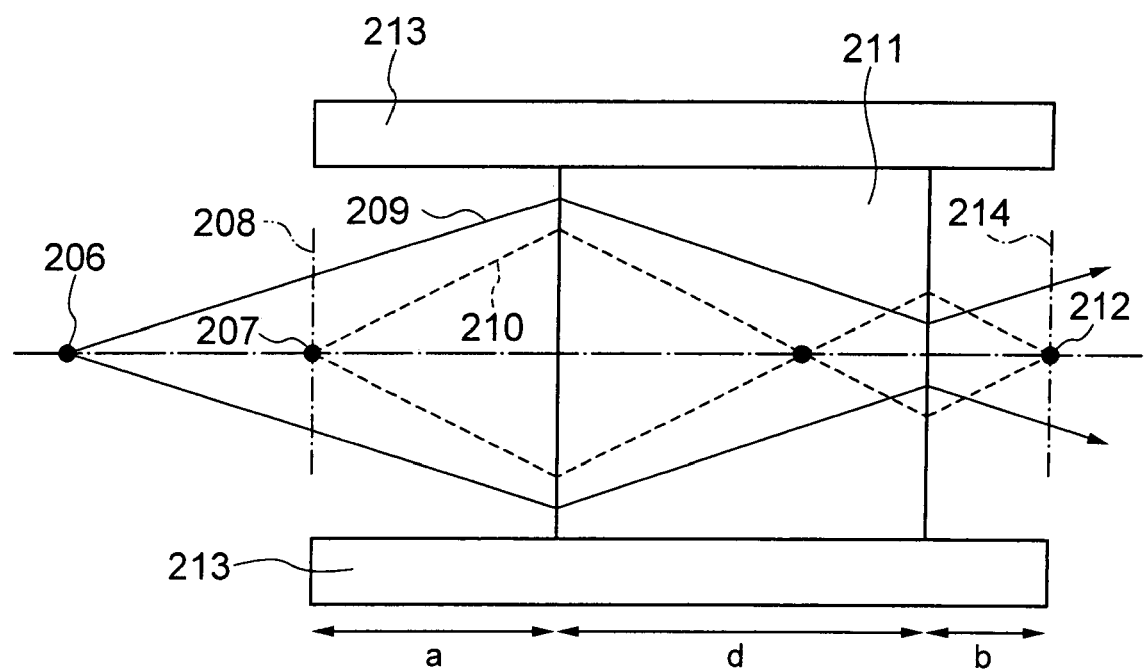
FIG. 23 is diagram showing a focusing optical system in which a negative refraction lens according to a second embodiment is used.

In a case of forming a focusing optical system by using a negative refraction lens, as shown in FIG. 23, an attention has to be paid to a thickness of a negative refraction lens 211. A light ray 210 shown by dotted lines bears an image formed of a point-light source 207, and focuses light at a focusing point 212 which is in conjugation with the point light source.

However, since an image of a point-light source 206 by the negative refraction lens 211 becomes a virtual image, the negative refraction lens 211 cannot focus a light ray 209 emerged from the point light source 206. As it was also shown in FIG. 1, unlike a normal lens, since an image-formation relationship of the negative refraction lens is indicated by a+b=d for a thickness d of the lens, when a>b, then b<c, and this is for not forming a real image.

In this manner, even when it is a case in which the negative refraction lens 211 does not form a real image, for example, when a pin hole is provided at a position of a point light source 207, on an information plane which shields light, it is possible to focus once again, the laser beam on the focusing point 212.

The negative refraction lens 211 is capable of the perfect imaging beyond the diffraction limit, no matter how minute a shape of the pin hole is, and how minute the structure is, an intensity distribution of a laser beam same as it is reproduced at the focusing point 212. According to the argument mentioned above, it is evident that the optical system according to the present invention is applicable to a focusing optical system.

Furthermore, as a modified embodiment of the focusing optical system, instead of the pin hole, a one-dimensional or a two-dimensional pattern can also be disposed on the information plane 208. For this pattern, a material such as a photomask, a diffraction grating, a hologram, a photonic crystal, or a material in which, digital information is modulated to a two-dimensional bit-map pattern can be used. In a case of using any of these materials, information of an amplitude and a phase thereof is (to be) reproduced on a focusing plane 214 via the negative refraction lens 211.

As it is revealed from the embodiments (for example FIG. 1) of the present invention, for the image formation of the entire propagating light which bears information of high spatial frequency, it is necessary to dispose the compensating element in a range of the angle of emergence θ and the image-formation angle corresponding to this from 0° to 90°. In other words, the compensating element which is disposed to cover the negative refraction lens has to be extended up to the object plane and the image plane.

Moreover, without restricting to this, as it can be easily imagined upon having looking at the embodiment (FIG. 6 to FIG. 11), even in a case such as when the compensating element covers the entire negative refraction lens, or a part of the negative refraction lens, and when the compensating element is bigger than a side surface of the negative refraction lens, but is not in contract with the object plane or the image plane, it is needless to mention that the effect of the present invention is achieved.

In this manner, it is possible to change a size and a shape of the compensating element according to the image-formation performance which is sought. As a matter of course, the compensating element may be made bigger so as to cover up to an outer side of the object plane and the image plane.

Moreover, an advantage when the compensating element is made smaller conversely, is that a working distance can be secured. For example, in a case of applying the present invention to a scanning microscope, an observation sample is to be placed on the object plane 102 in FIG. 1.

Therefore, by the compensating element and the observation sample making a mutual contact, there is a possibility that one of or both of the compensating element and the observation sample is or are damaged. Therefore, even when a portion of the compensating element 106, which is protruding from the negative refraction lens 101 toward the object side is halved, it is possible to compensate accurately the light ray at the angle of emergence θ shown in FIG. 1.

THIRD EMBODIMENT

A third embodiment according to the present invention will be described below by referring to FIG. 24 to FIG. 29. Since there are many reference numerals which are common in these diagrams, reference numerals of earlier diagram numbers are to be referred to, and the reference numerals which are in common are omitted.

Figure 24:
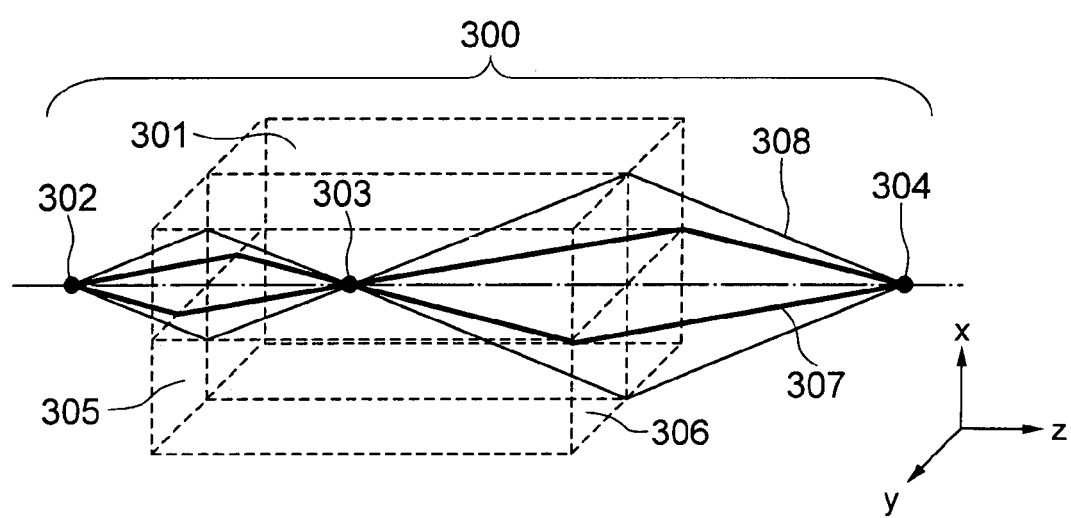
FIG. 24 is a three-dimensional diagram describing an image formation in which a rectangular shaped negative refraction lens according to a third embodiment is used.

An optical system 300 in FIG. 24 shows an image formation by a negative refraction lens 301 having a rectangular shape. It is not shown in the diagram, but similarly as in FIG. 1 etc., the negative refraction lens 301 is covered by a diffraction grating. Light rays 307 and 308 which have emitted from an object point 302, after being focused at an intermediate image-formation point 303 inside the negative refraction lens 301, form an image at an image point 304 which is outside the negative refraction lens 301.

Coordinate axes indicating a three-dimensional rectangular coordinate system are shown in the diagram. Here, a light ray 307 and a light ray 308 indicate a propagating light in an xz plane and a yz plane respectively. When the negative refraction lens 301 is made of an isotropic material which does not have a birefringence, it follows that image-formation points in the xz plane and the yz plane are coincide.

Figure 25:
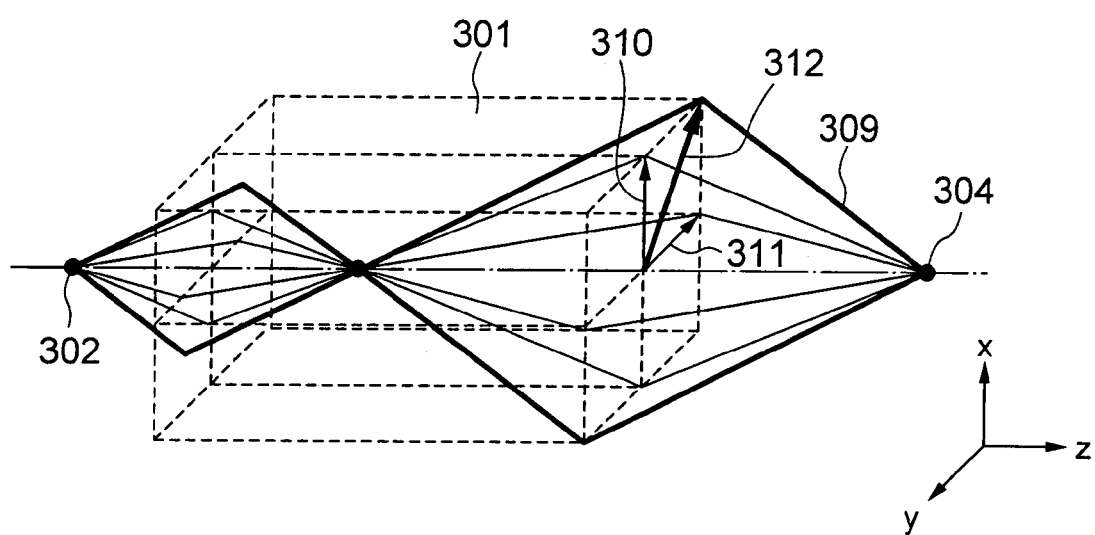
FIG. 25 is a three-dimensional diagram describing the image formation in which the rectangular shaped negative refraction lens according to the third embodiment is used.

Since an arbitrary propagating light emitted from the object point 302 can be divided into a propagating component in the plane xz and a propagating component in the plane yz, FIG. 24 secures that the arbitrary propagating light forms an image at the same object point. This is indicated in FIG. 25. Propagating light rays in the xz plane and the yz plane are indicated by continuous lines, and a propagating light ray 309 in which these propagating light rays are combined are shown by thick lines respectively.

Moreover, an x-component 310 of a wave-number vector of a light wave which is transferred on the xz plane, a y-component 311 of a wave-number vector of a light wave which is transferred on the yz plane, and also a wave-number vector 312 in which the x-component 310 and the y-component 311 are combined are shown in the diagram.

Figure 26:
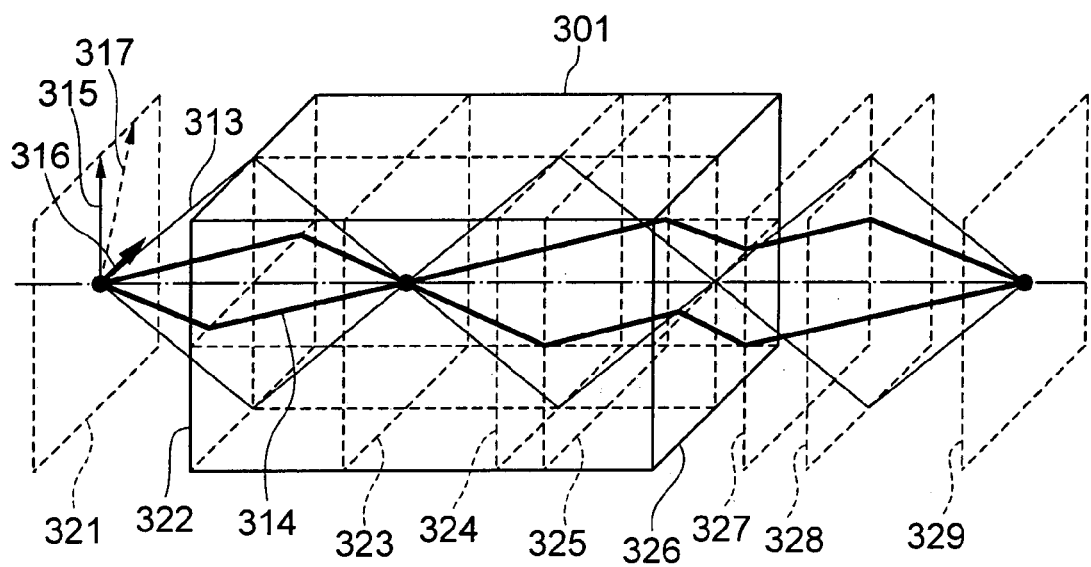
FIG. 26 is a three-dimensional diagram when a compensating element is used in the rectangular shaped negative refraction lens according to the third embodiment.
Figure 26:
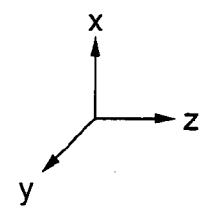

FIG. 26 shows an image formation when the effect of the compensating element is anticipated, in other words an image formation of a propagating light component having a high spatial frequency. A light ray 313 which contributes to the image formation in the xz plane is refracted at a surface 322 of the negative refraction lens, and after forming an image at the intermediate image-formation point 303, is reflected by the compensating element at a surface 324, then refracted at a surface 326 of the negative refraction lens, and reflected once again by the compensating element at a surface 328, and reaches the image point 304.

On the other hand, a light ray 314 which contributes to the image formation in the yz plane is refracted at the surface 322 of the negative refraction lens, then after image formation at the intermediate image-formation point 303, reflection at a surface 325, refraction at the surface 326 of the negative refraction lens, and reflection at a surface 327, reaches the image point 304.

Here also, a wave-number vector 315 of the light ray 313 which contributes to the image formation in the xz plane, a wave-number vector 316 of the light ray 314 which contributes to the image formation in the yz plane, and a wave-number vector 317 in which the wave-number vector 315 and the wave-number vector 316 are combined, are shown in the diagram. In this manner, it follows that a three-dimensional image formation is carried out correctly even for a high-frequency component required by the compensating element.

Planes 321 to 329 shown in FIG. 26 indicate a position at which the light ray 313 and the light ray 314 undergo one of a reflection, a refraction, and an image formation, and each plane is disposed perpendicular to an optical axis.

Figure 27:
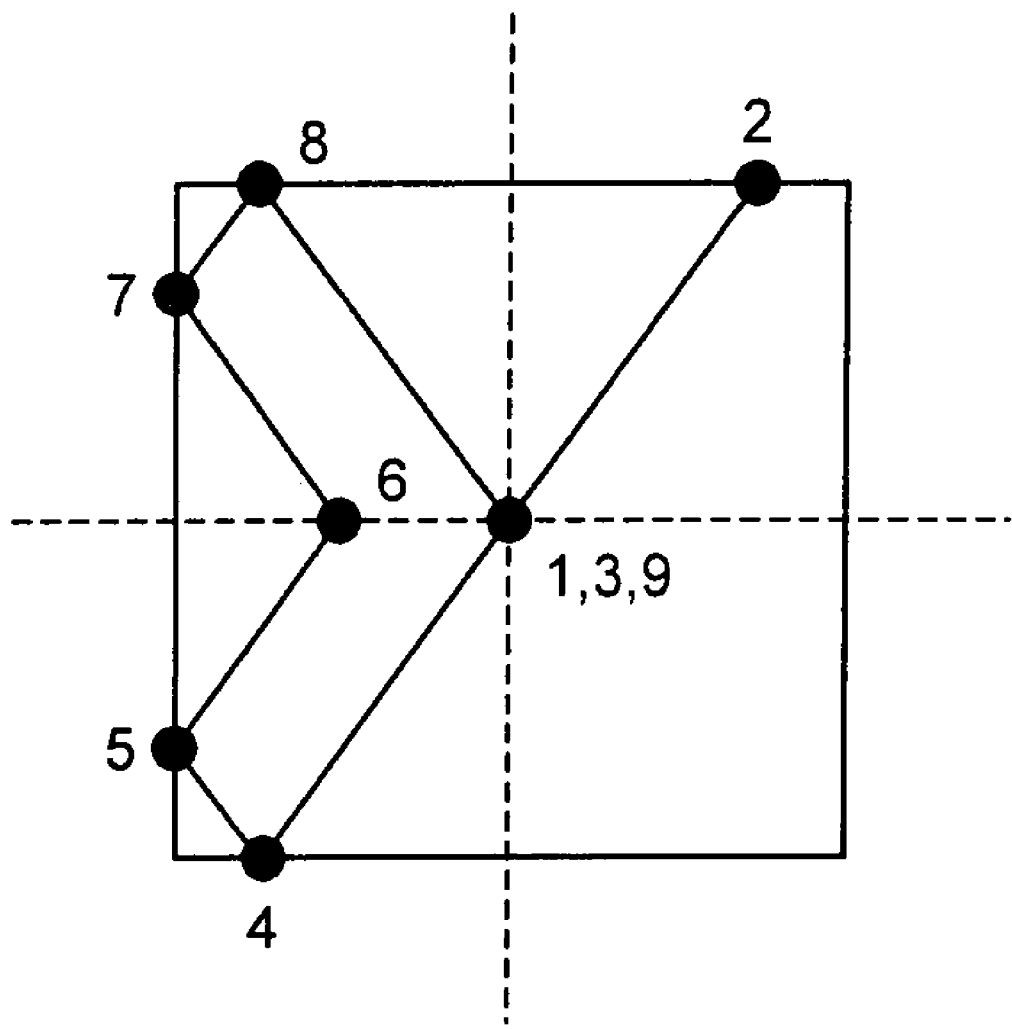
FIG. 27 is a diagram when the image formation according to the third embodiment is viewed from a top of an optical axis

FIG. 27 is a light-ray diagram when the light indicated by the wave-number vector 317 which is lead to the image formation, is viewed from a z-axis direction (image-point side). In FIG. 27, positions at which the light rays intersect the planes 321 to 329 are indicated by points 1 to 9 respectively.

Figure 28:
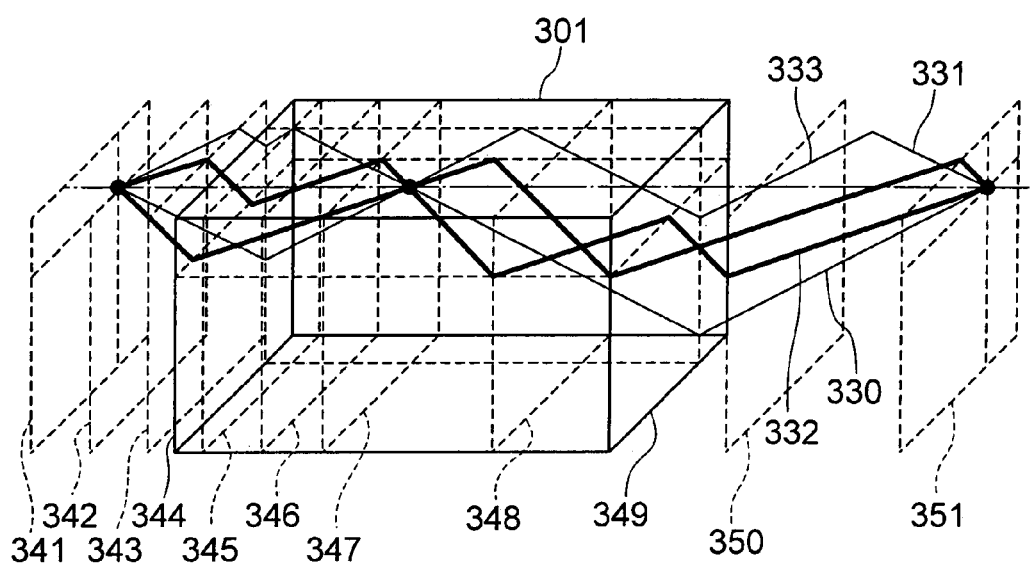
FIG. 28 is a three-dimensional diagram when the compensating element is used in the rectangular shaped negative refraction lens according to the third embodiment.
Figure 28:
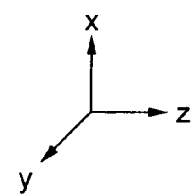

A case in which the object point and the image point are not on a central axis of the negative refraction lens was described in FIG. 2, and indication regarding a rectangular shaped negative refraction lens is in FIG. 28. Since a path of a light ray resembles to the optical path in FIG. 26, detailed description thereof is omitted. Here, light rays 330 and 332 which contribute to the image formation in the xz plane and the yz plane undergo one of the reflection, the refraction, and the image formation at planes 341 to 351.

Figure 29:
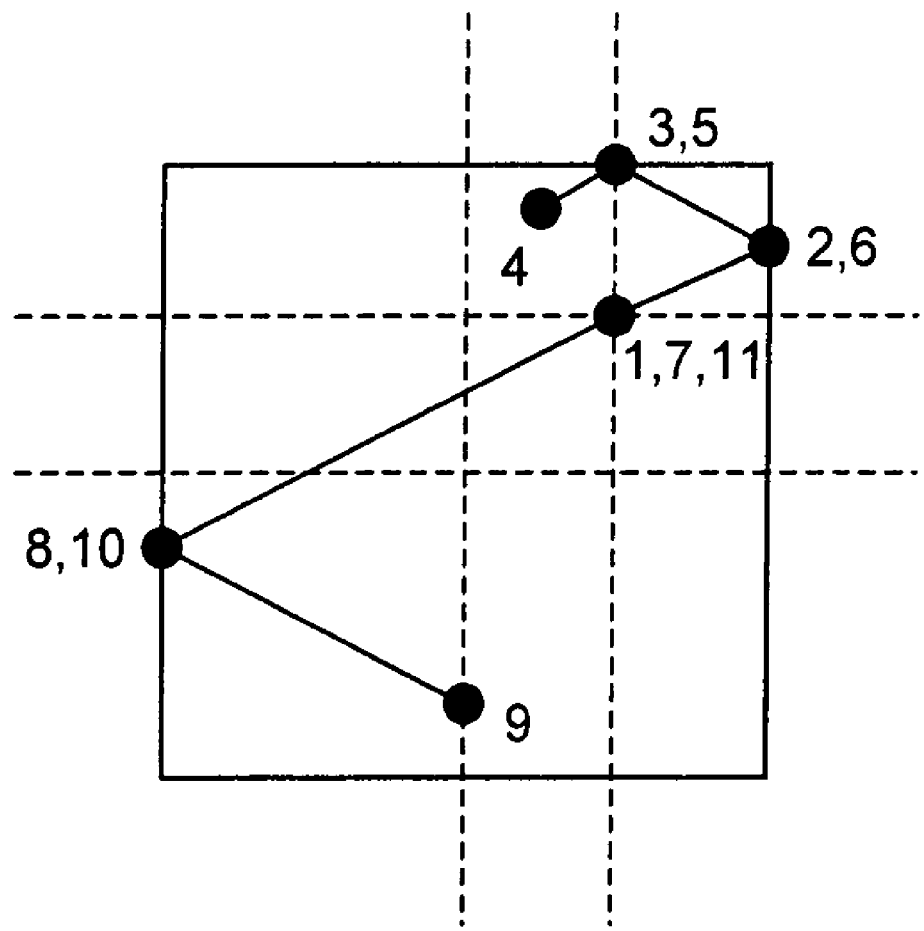
FIG. 29 is a diagram when the image formation according to the third embodiment is viewed from the top of the optical axis.

FIG. 29 is a light-ray diagram when the light rays 330 and 332 reaching the image point 304 from the object point 302 are viewed from the z-axis direction (image point side). Points 1 to 11 in FIG. 29 correspond to the planes 341 to 351 respectively, in FIG. 29. Similarly, it follows that a light rays 331 and 333 also reach the image point 304, and the image formation is carried out correctly.

Thus, in the image formation by the rectangular shaped negative refraction lens, it was confirmed that object point information which is not on a central axis of the lens is formed as an image correctly at the image point. Since this works out for an arbitrary object-point position on the object plane, it shows that two-dimensional information on the object plane can be transferred and formed as an image correctly.

As it has been mentioned above, the optical system according to the present invention is useful for an image forming optical system such as a microscope, a camera, and an endoscope, a focusing optical system such as an optical pickup and a semiconductor exposing apparatus, and a guided-wave optical system such as an optical integrated circuit, and an optical fiber.

According to the present invention, it is possible to realize the perfect imaging effect beyond the diffraction limit, by allowing a part of the propagated light component which was lost when a size of the conventional negative refraction lens was finite, to contribute by transferring to the image plane.

What is claimed is:
1. An optical system comprising:
   an optical element which is formed of a material exhibiting negative refraction; and
   a guide element which guides light to an effective aperture of the optical element,
   wherein the guide element is disposed coextensively with at least substantially an entire side surface of the optical element such that the guide element covers substantially the entire side surface of the optical element.

2. The optical system according to claim 1, wherein the guide element is an element which deflects light.

3. The optical system according to claim 2, wherein the guide element reflects and/or diffracts light which is incident.

4. The optical system according to claim 1, wherein the optical element formed of the material exhibiting negative refraction has a rectangular shape, and
the guide element is disposed such that the guide element covers at least a side surface of the rectangular shape, along a direction of which the light travels.

5. The optical system according to claim 4, wherein the guide element is a mirror.

6. The optical system according to claim 5, wherein a reflectance of the mirror is higher than 35%.

7. The optical system according to claim 1, wherein the guide element is a diffraction grating.

8. The optical system according to claim 1, wherein the guide element is a hologram.

9. The optical system according to claim 1, wherein the guide element is a photonic crystal.

10. The optical system according to claim 1, wherein when a numerical aperture of the effective aperture is let to be NA, then NA<0.5 is satisfied.

11. An optical system comprising:
an optical element which is formed of a material exhibiting negative refraction; and
a guide element which guides light to an effective aperture of the optical element;
wherein an information plane which modulates one of an amplitude and a phase of the light is disposed at a position at which a distance from the optical element which is formed of the material exhibiting negative refraction is less than a thickness of the optical element which is formed of the material exhibiting negative refraction.

12. The optical system according to claim 11, wherein the information plane is any one of a plate in which a pin-hole is formed, a photomask, a diffraction grating, a hologram, a photonic crystal, and a data pattern in which digital information is modulated one-dimensionally or two-dimensionally.

* * * * *